(12) United States Patent  
Ayala Romero et al.

(10) Patent No.: US 11,844,100 B2
(45) Date of Patent: Dec. 12, 2023

(54) VIRTUAL RADIO ACCESS NETWORK CONTROL

(71) Applicant: NEC Laboratories Europe GmbH, Heidelberg (DE)

(72) Inventors: Jose Ayala Romero, Heidelberg (DE); Andres Garcia-Saavedra, Heidelberg (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 654 days.

(21) Appl. No.: 16/533,837

(22) Filed: Aug. 7, 2019

(65) Prior Publication Data

US 2020/0296741 A1 Sep. 17, 2020

Related U.S. Application Data

(60) Provisional application No. 62/817,024, filed on Mar. 12, 2019.

(51) Int. Cl.
*H04W 72/50* (2023.01)
*G06N 3/08* (2023.01)

(52) U.S. Cl.
CPC ............ *H04W 72/535* (2023.01); *G06N 3/08* (2013.01)

(58) Field of Classification Search
None
See application file for complete search history.

(56) References Cited

U.S. PATENT DOCUMENTS

| 8,649,341 B2 | 2/2014 | Guey et al. |
| 2013/0185729 A1 | 7/2013 | Vasic et al. |

| 2017/0034841 A1* | 2/2017 | Bethanabhotla ...... H04L 5/0048 |
| 2017/0257289 A1* | 9/2017 | Cui ........................ G06N 20/00 |
| 2017/0318468 A1* | 11/2017 | Aijaz .................... H04W 16/10 |
| 2018/0013680 A1* | 1/2018 | Bull ...................... H04W 16/14 |

(Continued)

FOREIGN PATENT DOCUMENTS

EP 2849524 B1 3/2017

OTHER PUBLICATIONS

Sheryl L. Howard, et al., "Error Control Coding in Low-Power Wireless Sensor Networks: When is ECC Energy-Efficient?", EURASIP Journal on Wireless Communications and Networking, Dec. 2006, pp. 1-17.

(Continued)

*Primary Examiner* — Yaotang Wang
(74) *Attorney, Agent, or Firm* — Leydig, Voit & Mayer, Ltd.

(57) ABSTRACT

A radio access network includes a processing system and one or more radio access points configured to broadcast over a radio band including one or more radio channels. Contextual data is acquired which is representative of at least one of: (i) a quality of the radio band and (ii) a quantity of data demanded by user equipment in communication with the one or more radio access points over the radio band. A compute policy and a radio policy are generated based on the acquired contextual data. Data transmissions for processing are assigned to computing resources of the processing system based on the compute policy. Data are scheduled for transmission over the radio band based on the radio policy. A modulation and coding scheme for the scheduled data transmissions is selected based on the radio policy.

18 Claims, 20 Drawing Sheets

(56) References Cited

U.S. PATENT DOCUMENTS

2019/0014488 A1* 1/2019 Tan .................... G06N 3/084
2019/0380125 A1* 12/2019 Yamamoto ............ H04L 5/0091

OTHER PUBLICATIONS

Peter Rost, et al., "The Complexity-Rate Tradeoff of Centralized Radio Access Networks", arXiv:1503.08585v3 [cs.IT], Aug. 9, 2015, pp. 1-13.
Dario Bega: "CARES: Computations-Aware Scheduling in Virtualized Radio Access Networks", IEEE Transactions on Wireless Communications, vol. 17, No. 12, Dec. 12, 2018, pp. 7993-8006.
Kang Cheng, et al., "Energy-Efficient Joint Offloading and Wireless Resource Allocation Strategy in Multi-MEC Server Systems", arXiv:1803.07243 [cs.IT], May 20-24, 2018, pp. 1-6.
Yuyi Mao, et al., "Stochastic Joint Radio and Computational Resource Management for Multi-User Mobile-Edge Computing Systems", arXiv:1702.00892v1 [cs.IT], Feb. 3, 2017, pp. 1-33.
Jessica Oueis, "Joint Coomunication and Computation Resources Allocation for Cloud-Empowered Future Wireless Networks", HAL archives-ouvertes.fr, Sep. 14, 2016, pp. 1-210.
Chiara Francalanci, et al., "Joint Admission Control and Resource Allocation in Virtualized Servers", J. Parallel Distrib. Comput., vol. 70, Sep. 6, 2009, pp. 344-362.
Sladana Josilo, et al., "Joint Allocation of Computing and Wireless Resources to Autonomous Devices in Mobile Edge Computing", MECOMM '18, Aug. 20, 2018, pp. 13-18.

* cited by examiner

VIRTUAL RADIO ACCESS NETWORK CONTROL

CROSS-REFERENCE TO PRIOR APPLICATION

The present application claims priority to U.S. Provisional Patent Application No. 62/817,024, filed on Mar. 12, 2019, which is hereby incorporated by reference.

FIELD

The present application relates, among other things, to radio access networks (RANs) such as control of a virtual RAN (vRAN).

BACKGROUND

RAN densification is a strategy to accommodate the increasing demand for mobile services (e.g., mobile data) via spatial densification and spectral aggregation. The advantages are well understood, namely, increased spectral efficiency via spatial reuse, reduced nominal link distances and wider bandwidth. However, this approach can require a substantial increase in capital and operating costs, and complicates management and control since individual radio access points (RAPs) handle fewer users, thereby causing network load to become highly volatile and unpredictable. The aggregation of multiple flows at traditional macro-cells compensates for the uncertainty of individual flows. Consequently, despite the appeal of network densification, it puts a strain on mobile system designers, who must exploit RAN densification while trying to reduce costs at the same time in order to preserve the sustainability of the mobile business in the long term.

A virtual RAN (vRAN) centralizes RAN stacks into cloud computing infrastructure as software stacks. This enhances resource pooling (via centralization), update roll-outs, and hardware management (as general-purpose computers can instantiate specialized virtual machines). vRAN facilitates network slicing, which allows mobile operators to share physical radio and compute infrastructure among different tenants, reducing maintenance costs and opening the door to new sources of revenue via tailoring.

SUMMARY

In an embodiment, the present invention provides a radio access network comprising a processing system and one or more radio access points configured to broadcast over a radio band including one or more radio channels. Contextual data is acquired which is representative of at least one of: (i) a quality of the radio band and (ii) a quantity of data demanded by user equipment in communication with the one or more radio access points over the radio band. A compute policy and a radio policy are generated based on the acquired contextual data. Data transmissions for processing are assigned to computing resources of the processing system based on the compute policy. Data are scheduled for transmission over the radio band based on the radio policy. A modulation and coding scheme for the scheduled data transmissions is selected based on the radio policy.

BRIEF DESCRIPTION OF THE DRAWINGS

Embodiments of the present invention will be described below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
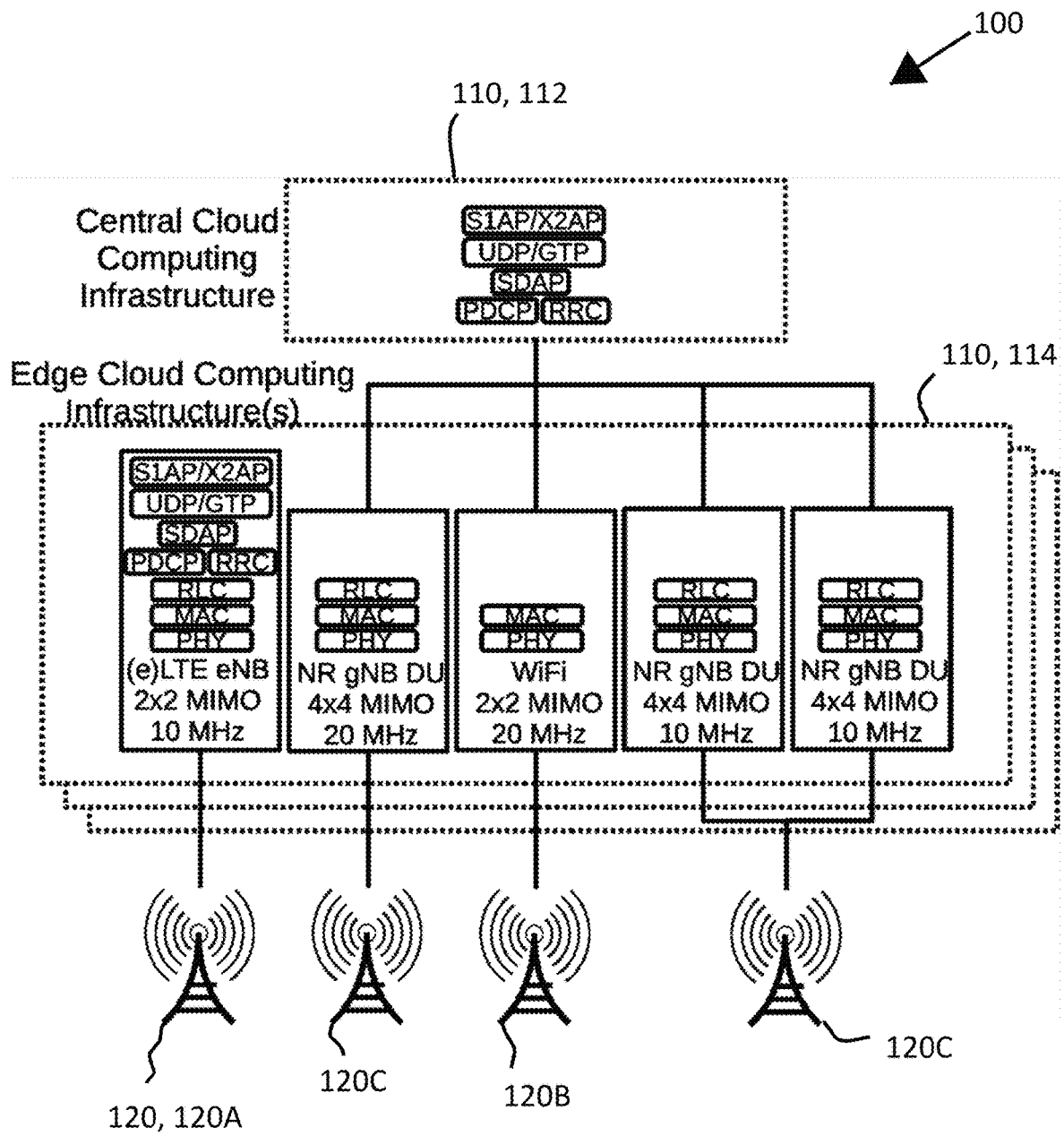
FIG. 1 is a schematic overview of an exemplary resource controller for edge computing infrastructure in mobile systems.

Existing vRAN systems have been unable to realize the technology's full potential. For example, computing resources are still inefficiently pooled since existing implementations schedule an inelastic series of real-time workloads causing over-allocation of computing to accommodate peak loads. Furthermore, the advent of flexible 5G (and beyond) RAN architectures, where vRAN's software stack is split into a distributed unit and a central unit, and the ability to roll out vRAN updates have made it challenging to characterize the relationship between radio and compute resource demands.

In an embodiment, the present invention discloses a method that can jointly improve: (i) compute scheduling policies and (ii) radio scheduling policies in a general-purpose cloud RAN environment managing multiple virtual radio access points (typically at the edge). The method can use historical data including signal quality information (e.g., information about the signal to noise) ratio of radio channels such as decoding error rates and buffer state reports (e.g., radio link control ("RLC") reports indexing the backlog of data stored buffered in memory awaiting modulation into radio waves) to optimize user delays and computing costs (e.g., to meet certain quality-of-service (QoS) targets).

Disclosed is a method of assigning resources of a radio access network comprising a processing system and one or more radio access points configured to broadcast over a radio band comprising one or more radio channels. The method can include: acquiring contextual data representative of at least one of: (i) a quality of the radio band and (ii) a quantity of data demanded by user equipment in communication with the one or more radio access points over the radio band; generating a compute policy and a radio policy based on the acquired contextual data; assigning data transmissions for processing to computing resources of the processing system based on the compute policy; scheduling data for transmission over the radio band based on the radio policy; and selecting a modulation and coding scheme for the scheduled data transmissions based on the radio policy.

In an embodiment, the data transmissions for processing comprise samples of modulated radio waves received by the one or more radio access points over the radio band from the user equipment and the method comprises: measuring data transmission delay, decoding errors, and processing system load; and generating the radio policy and the compute policy based on the measurements.

In an embodiment, the contextual data encodes both the quality of the radio band and the quantity of data demanded by the user equipment and acquiring the contextual data comprises: measuring a signal-to-noise ratio of the radio band and a rate of incoming data; and encoding the measured signal-to-noise ratio and the rate of incoming data into the contextual data, the contextual data comprising a matrix including one or more vectors.

In an embodiment, generating the compute policy and the radio policy comprises: feeding the contextual data into a compute neural network hosted on the processing system to create the compute policy and feeding the contextual data into a radio neural network hosted on the processing system to compute the radio policy, each of the policies comprising a respective matrix including one or more vectors.

In an embodiment, the method comprises: measuring a delay associated with buffering outgoing data awaiting modulation; measuring a computing load on the processing system; computing a reward based on the measured delay and the measured load; and training the compute neural network and training the radio neural network based on the computed reward.

In an embodiment, the reward is a scalar, the compute neural network comprises a plurality of compute nodes each including a weighted receptive field and a bias, the radio neural network comprises a plurality of radio nodes each including a weighted receptive field and a bias, and the method comprises: training the compute neural network by reweighting and rebiasing the compute nodes based on multiple instances of the contextual data captured across time and multiple instances of the reward captured across time, wherein each of the contextual data instances is paired with a respective one of the reward instances; and training the radio neural network by reweighting and rebiasing the radio nodes based on the multiple instances of the contextual data captured across time and the multiple instances of the reward captured across time.

In an embodiment, the contextual data comprises a matrix including a plurality of values and each of the values within the matrix is a scalar encoding both the quality of the radio band and the quantity of data demanded.

Disclosed is a processing system configured to assign resources of a radio access network comprising one or more radio access points configured to broadcast over a radio band comprising one or more radio channels. the processing system can include one or more processors configured to: acquire contextual data representative of at least one of: (i) a quality of the radio band and (ii) a quantity of data demanded by user equipment in communication with the one or more radio access points over the radio band; generate a compute policy and a radio policy based on the acquired contextual data; assign data transmissions for processing to computing resources of the processing system based on the compute policy; schedule data for transmission over the radio band based on the radio policy; and select a modulation and coding scheme for the scheduled data transmissions based on the radio policy.

In an embodiment, the data transmissions for processing comprise samples of modulated radio waves received by the one or more radio access points over the radio band from the user equipment and the one or more processors are configured to: measure data transmission delay, decoding errors, and processing system load; and generate the radio policy and the compute policy based on the measurements.

In an embodiment, the contextual data encodes both the quality of the radio band and the quantity of data demanded by the user equipment and the one or more processors are configured to acquire the contextual data by: measuring a signal-to-noise ratio of the radio band and a rate of incoming data; and encoding the measured signal-to-noise ratio and the rate of incoming data into the contextual data, the contextual data comprising a matrix including one or more vectors.

In an embodiment, the one or more processors are configured to generate the compute policy and the radio policy by: feeding the contextual data into a compute neural network hosted on the processing system to create the compute policy and feeding the contextual data into a radio neural network hosted on the processing system to compute the radio policy, each of the policies comprising a respective matrix including one or more vectors.

In an embodiment, the one or more processors are configured to: measure a delay associated with buffering outgoing data awaiting modulation; measuring a computing load on the processing system; compute a reward based on the measured delay and the measured load; and train the compute neural network and training the radio neural network based on the computed reward.

In an embodiment, the reward is a scalar, the compute neural network comprises a plurality of compute nodes each including a weighted receptive field and a bias, the radio neural network comprises a plurality of radio nodes each including a weighted receptive field and a bias, and the one or more processors are configured to: train the compute neural network by reweighting and rebiasing the compute nodes based on multiple instances of the contextual data captured across time and multiple instances of the reward captured across time, wherein each of the contextual data instances is paired with a respective one of the reward instances; and train the radio neural network by reweighting and rebiasing the radio nodes based on the multiple instances of the contextual data captured across time and the multiple instances of the reward captured across time.

In an embodiment, the contextual data comprises a matrix including a plurality of values and each of the values within the matrix is a scalar encoding both the quality of the radio band and the quantity of data demanded.

Disclosed is a non-transitory computer readable medium comprising code for configuring one or more processors to: acquire contextual data representative of at least one of: (i) a quality of the radio band and (ii) a quantity of data demanded by user equipment in communication with one or more radio access points over the radio band; generate a compute policy and a radio policy based on the acquired contextual data; assign data transmissions for processing to computing resources of the processing system based on the compute policy; schedule data for transmission over the radio band based on the radio policy; and select a modulation and coding scheme for the scheduled data transmissions based on the radio policy.

Referring to FIG. 1, a radio access network (RAN) 100 can include a processing system 110 for hosting cloud computing services and one or more radio access points (RAPs) 120 for broadcasting radio waves (also called electromagnetic waves) to and receiving radio waves from user equipment (UE). The processing system can be distributed. Therefore, the processing system can include hardware (e.g., processors and memory) installed across multiple different facilities. As shown in FIG. 1, the processing system can include central cloud computing infrastructure 112 and edge cloud computing infrastructure 114. RAPs can include any kind of radio transceivers such as cellular towers, WiFi access points, etc. UE can include any device configured for wireless communication such as a desktop computer, a mobile device (e.g., a smartphone, a tablet, a laptop), a vehicle, etc.

RAPs may rely on any protocol to wirelessly communicate with UEs. In FIG. 1, for example, RAP 120A is configured for 4G LTE communication, RAP 120B is configured for WiFi communication, and RAPs 120C are configured for 5G communication.

The RAN shown in FIG. 1 (also called a vRAN) consumes both computing power and electromagnetic spectrum across time. The RAN consumes computing power to instantiate and sustain virtual RAPs (e.g., virtual machines, Docker containers, or Linux processes) for: (i) scheduling consumption of the finite electromagnetic spectrum (also called radio spectrum) assigned to the RAPs, (ii) encoding digital data into waves for broadcast by the RAPs to the UEs, and (iii) decoding waves received by the RAPs from the UEs into digital data. The RAN consumes radio bandwidth by broadcasting and receiving the radio waves.

As previously discussed, FIG. 1 illustrates an embodiment of the invention, with a cloud computing infrastructure shared by heterogeneous RAPs (e.g., slices of RAPs). This embodiment can address resource allocation in computing platforms where one or multiple vRAN software stacks are processed (e.g., at the edge). A vRAN software stack can be one or more virtual machines (e.g., Linux containers) instantiated in the processing system (e.g., in the cloud computing resources).

Figure 2:
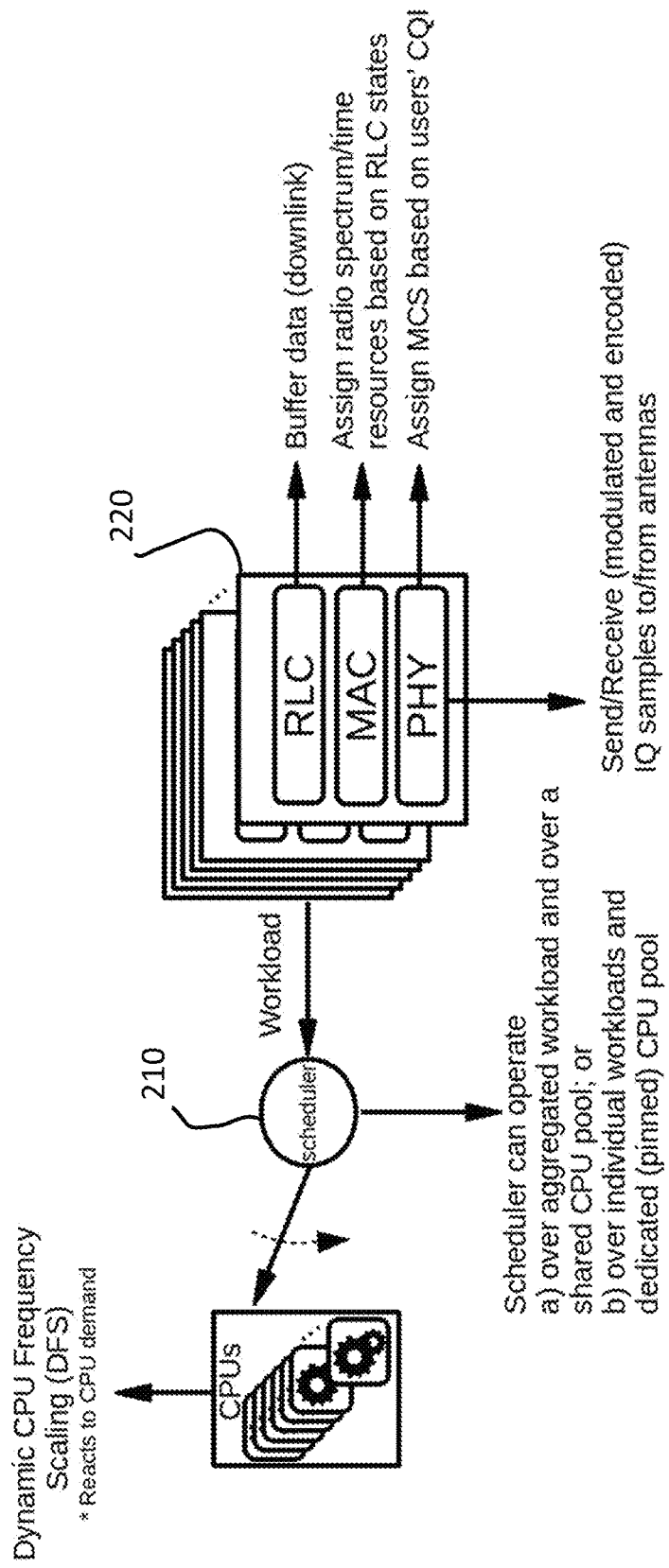
FIG. 2 is a schematic overview of an exemplary conventional vRAN resource control.
Figure 3:
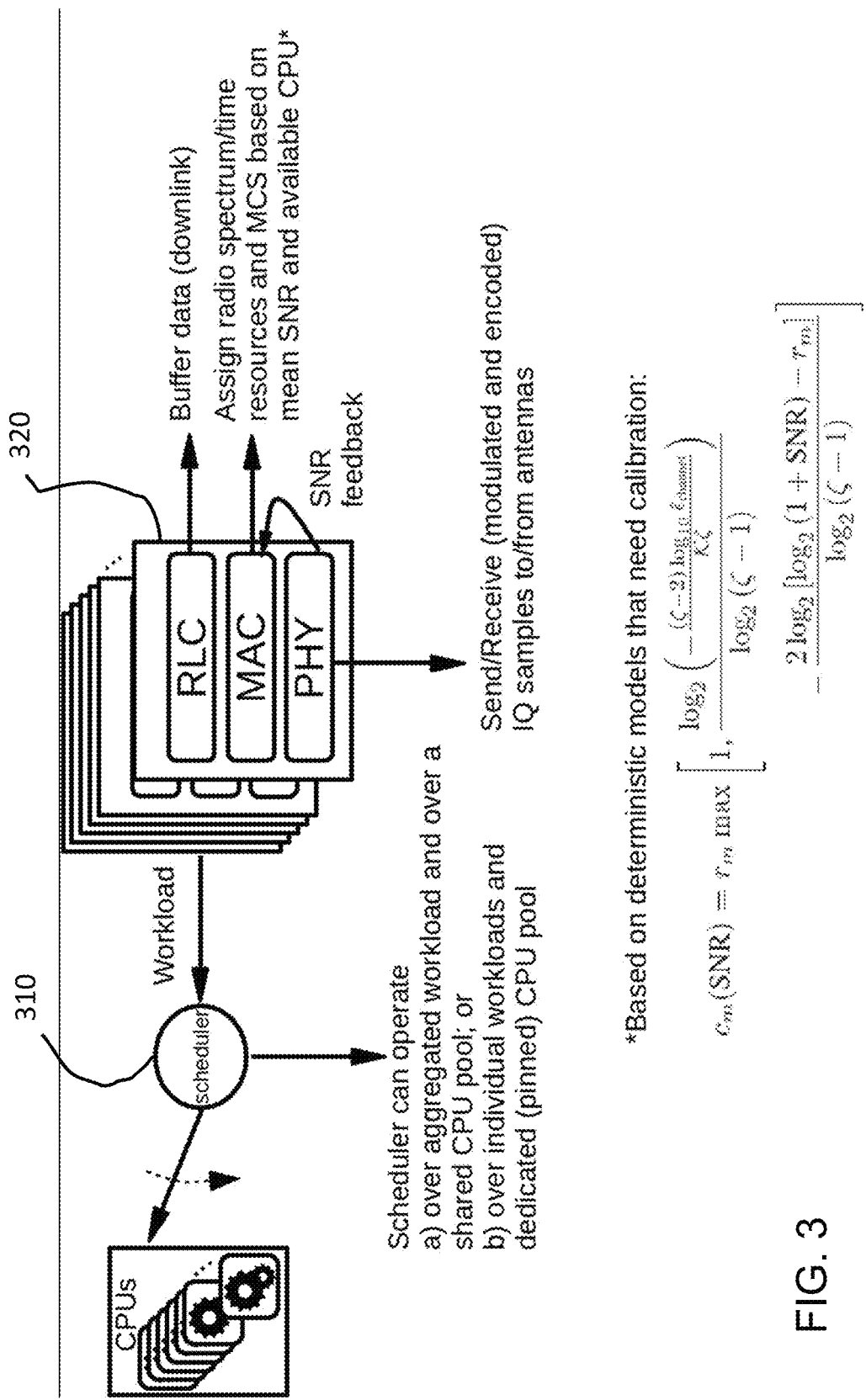
FIG. 3 is a schematic view of an exemplary compute-aware radio resource control.

In an embodiment, the invention enables efficient resource pooling. Referring to conventional systems as shown in FIGS. 2 and 3, inefficiencies can occur when a first scheduler 210, 310 in charge of allocating computing workload (also called processing resources, processing power, and computing power) is functionally independent from a second scheduler 220, 320 in charge of allocating radio resources and selecting modulation levels and coding schema (MCS). The delay or throughput performance of a RAP can depend on available compute resources and radio scheduling policies (e.g., MCS selection). This dependency can vary depending on the signal-to-noise ratio (SNR) conditions for radio broadcasts and/or the amount of traffic each RAP has to handle.

The foregoing coupling issue has been addressed by D. Bega, et al., "CARES: Computation-Aware Scheduling in Virtualized Radio Access Networks," in IEEE Transactions on Wireless Communications, vol. 17, no. 12, pp. 7993-8006 (December 2018); K. Cheng, et al., "Energy-efficient joint offloading and wireless resource allocation strategy in multi-mec server systems," In 2018 IEEE International Conference on Communications (ICC), pp. 1-6 (May 2018); and S. Josilo, et al., "Joint allocation of computing and wireless resources to autonomous devices in mobile edge computing," In Proceedings of the 2018 Workshop on Mobile Edge Communications, MECOMM'18, pp. 13-18 (August 2018). Each of these documents is hereby incorporated by reference.

Documents identified above rely on deterministic models that need to be (pre) calibrated for specific scenarios (see FIG. 3). D. Bega, et al., does not exploit buffer state information to make radio scheduling decisions. In contrast, the relationship that system performance has with compute and radio scheduling policies is far from trivial and highly dependent on context (data arrival patterns, SNR patterns), software implementation, and hardware implementation. As a result, model-based approaches become impractical and overly expensive in real systems. Conversely, an embodiment of the invention leverages learning models that have the ability to adapt naturally to contextual changes or system updates.

In an embodiment, the present invention discloses a method including: (1) making compute/radio resource allocation decisions jointly (within a processing system) to improve resource pooling cost-efficiency, and (2) applying automated learning models within the processing system. According to another embodiment, a system that exploits such joint learning strategy is provided.

In an embodiment, the present invention provides a method for assigning compute resources (e.g., cloud computing infrastructure) in a radio communication system having multiple RAPs connected with one out of multiple vRAPs running on a common cloud-based computing infrastructure. The method can include: acquiring contextual information from the transmitters, including signal-to-noise temporal variations and data demand temporal variations; selecting radio and compute scheduling policies based on the contextual information; assigning received data transmissions to the compute resources based on the compute scheduling policy; assigning buffered data transmissions to radio resources based on the radio scheduling policy; selecting a modulation and coding scheme for the data transmissions based on the radio scheduling policy; and measuring performance indicators including data transmission delays, frame decoding errors and/or computational load.

In an embodiment, the invention provides a system that dynamically adjusts computing and radio scheduling policies jointly across one or multiple virtual radio access points (vRAPs) running on an edge cloud computing environment in a centralized manner as depicted in FIG. 1. The system improves over existing systems by jointly coordinating consumption of computing and radio resources through learning the cause-effect relationship between them with the goal of balancing user communication performance (low delay, high throughput, etc.) and system operating costs (e.g. reduce resource consumption, increase resource pooling) and/or meeting QoS constraints.

Radio spectrum can be segmented into units (e.g., channels). The RAN can schedule the channels for tasks. For example, the RAN can schedule a first radio channel (e.g., a channel ranging from 0-1 MHz) for broadcasting data: to a first UE during $t_0$-$t_1$, to a second UE during $t_1$-$t_2$, and to the first and second UE during $t_2$-$t_3$. Within the present application, a "channel" can identify a band of frequency of any size (e.g., having a bandwidth of ⅒ MHz, 1 MHz, 100 MHz, 1 KHz, etc.). A "resource element" can identify a frequency band (also called a channel) over a unit of time (e.g., 1 ms, 10 ms, 100 ms). A "resource block" can identify one or more resource elements. A "subframe" can identify one or more resource blocks. Therefore, a subframe can identify one or more frequency bands (e.g., channels 1-5) across one or more units of time (e.g., 30 ms). The processing system can be configured to schedule radio spectrum on a resource element, resource block, or subframe basis.

Figure 4:
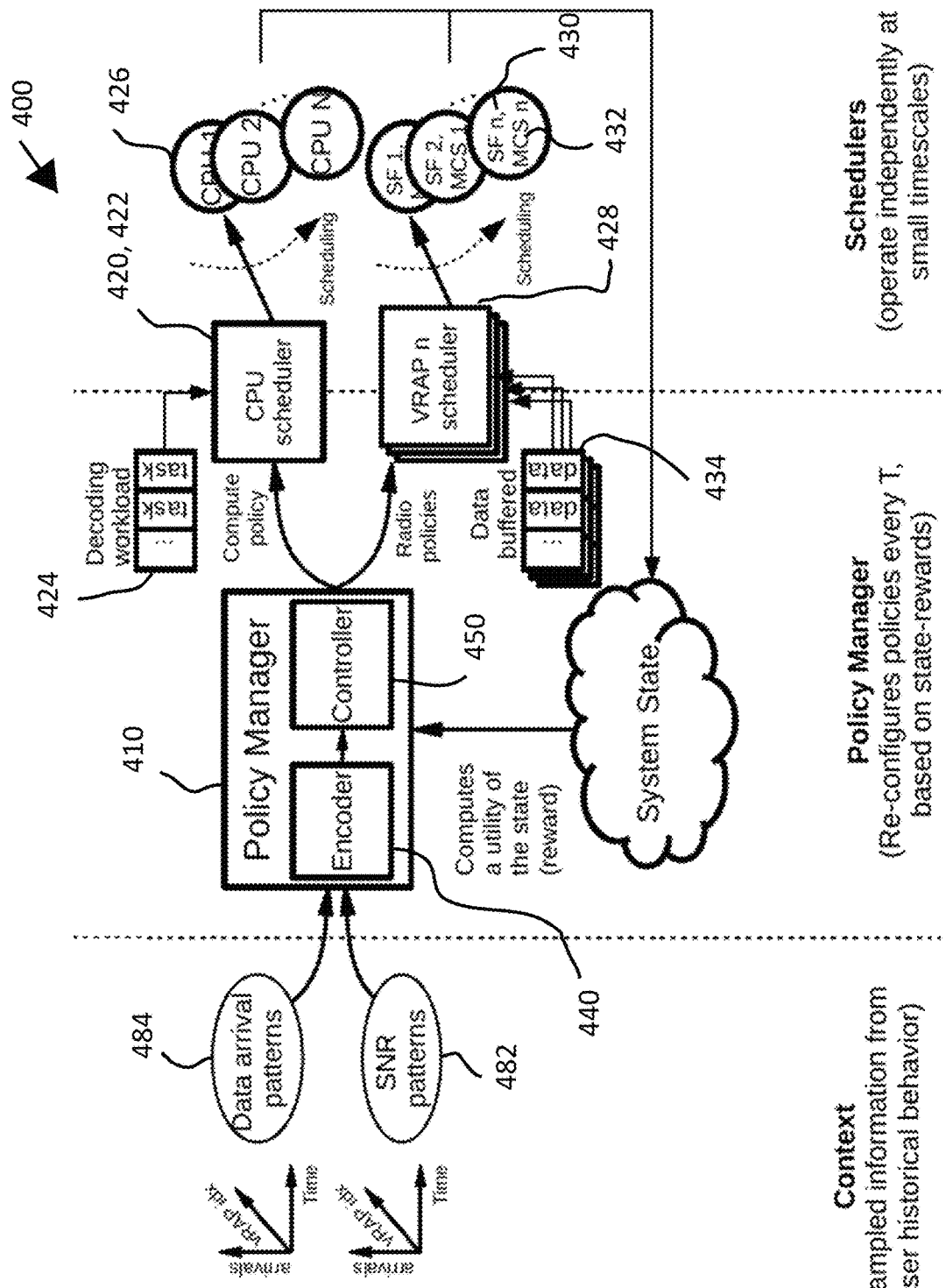
FIG. 4 is a schematic view of an exemplary high-level system architecture.

FIG. 4 depicts an exemplary architecture 400 for the processing system. The architecture can include two modules: (1) a policy manager 410, which can operate in long intervals (e.g., seconds), and (2) radio/compute schedulers 420, which can operate in small intervals (e.g., milliseconds). Embodiments of the invention can be applied to both downlink schedulers and/or uplink schedulers and both.

The compute scheduler 422 (also called CPU scheduler) can be configured to assign computing workload 424 (e.g., subframes to decode) to available processing hardware 426 (e.g., one or more CPUs) according to a computing policy. An example of a computing policy is one that sets the time-share of cloud computing resources assigned to each vRAP (e.g., 25% and 75% of compute time-share in a system comprised of two vRAPs). An example of a radio policy is one that sets the time-share of spectrum resources and maximum modulation and coding scheme ("MCS") available to each user of each vRAP (e.g., {20, 50, 30} % time-share and {18, 10, 10} maximum MCS indexes in a vRAP with 3 users).

Similarly, the radio scheduler 428 (also called a vRAP scheduler) of each vRAP can assign radio resources 430 (e.g., a set of consecutive resource blocks forming a subframe) to users of the vRAP (e.g., by assigning the radio resources to buffered data 434 awaiting encoding and/or modulation) and select an MCS 432 (e.g., an MCS level) for those radio resources according to a radio policy.

Each network standard (e.g., 4G LTE, 5G, WiFi) can be configured to encode and decode via a plurality of MCSs. Low level MCSs can have lesser bitrates in order to reduce error over a channel with low signal-to-noise power ratio ("SNR"). High level MCSs can have greater bitrates in order to take advantage of high SNR. Therefore, the processing system (e.g., via the radio policy) can be configured to select an MCS for encoding a resource block based on quality of the channel that can be quantified with a SNR over which the resource block is scheduled for transmission.

According to an embodiment, a policy manager is in charge of selecting compute and radio scheduling policies given a context identifying one or more states. The policy manager can be software for configuring the schedulers that assign resources to the virtual RAPs. The policy manager can be modeled as a contextual bandit (CB) problem. The CB problem can be a sequential decision making problem where, at every time step $n \in \mathbb{N}$, an agent observes a context or feature matrix (e.g., vector) drawn from an arbitrary feature space $x_n \in \chi$, chooses an action from a finite set of possible choices $a_n \in \mathcal{A}$ and receives a positive reward $0 \leq r_n(a_n)$ as feedback. As used herein, the term "matrix" conveys at least one vector (i.e., one or more vectors). Therefore, a matrix exists when at least one vector exists.

The sequence of context arrivals $\langle x_n \rangle_{n \in \mathbb{N}}$ and the distribution D over context-reward pairs (x, r) can be fixed and unknown a priori. For example, the classic multi-armed bandit (MAB) problem is a case of CB where X is a singleton. Finally, there can be a system policy $\pi(x)$: $\chi \rightarrow \mathcal{A}$ that maps contexts into actions and $R(\pi) := \mathbb{E}_{(x,r) \sim D}[r(\pi(x))]$ denotes the expected instantaneous reward of $\pi \in \Pi$. The policy manager can be configured to learn an optimal mapping function that maximizes the expected reward $$\pi^* := \underset{\pi \in \Pi}{\operatorname{argmax}} R(\pi).$$

With respect to context space, the policy manager can collect T mean channel quality indication (CQI) such as signal-to-noise ratio (SNR) samples 482: $s_{i,n} := \langle \sigma_{i,n}^{(t)} : 0 \leq t \leq T \rangle$ and new data bit arrivals 484: $b_{i,n} := \langle \beta_{i,n}^{(t)} : 0 \leq t \leq T \rangle$ within time step n−1 and n across all users attached to each RAP $i \in \mathcal{P}$. Other contextual information, such as variance SNR samples could be collected. New data bit arrivals 484 can be data queued at user equipment awaiting transmission to a RAP that was not present at the previous time step. Both time steps n and n−1 can be sampled to capture temporal dynamics (e.g., whether SNR is increasing or decreasing, whether data load is highly dynamic or static, etc.).

It can be assumed that both sample sequences are bounded, $0 < \sigma_{i,n}^{(t)} \leq S$ where S is the maximum CQI, and $0 < \beta_{i,n}^{(t)} \leq B$ where B the size of the buffers and obtained from a discrete space of possible values $\mathcal{B}$ and S, respectively. This information provides a snapshot of the context at each time step. Thus, the context or feature space is defined as $\chi := \{\mathcal{B} \cup \mathcal{S}\}^{|\mathcal{P}|}$. In some embodiments, the buffers store electronic data addressed to specific UE and ready for encoding and modulation.

With respect to action space, let $c_{n,i} \in \mathcal{C}$ and $m_{n,i} \in \mathcal{M}$ denote, respectively, the amount of (relative) compute time (compute scheduling policy) and a radio scheduling policy, e.g. the maximum MCS allocated to RAP i in time step n. Both $\mathcal{C}$ and $\mathcal{M}$ can correspond to discrete sets of eligible configurations or scheduling policies, e.g., $\mathcal{C} = \{0, 0.5, 1, 1.5, 2\}$ computing time relative to a single CPU is an example of a set of eligible compute scheduling policies in a system with two CPUs. In an embodiment, the values within C can correspond to the amount of processing resources allocated at a time step. $C_{n,i} = 0$ can mean that $vRAP_i$ obtains zero processing resources at time step n. $C_{n,i} = 2$ can mean that $vRAP_i$ obtains two processing resources (e.g., two CPUs) at time step n. In this way, an action $a_n$ can correspond to a vector collecting the compute and radio scheduling policies for all (e.g., a plurality of) processing resources and for all RAPs, $\mathcal{A} := \{(c_i \in \mathcal{C}, m_i \in \mathcal{M} : \forall i \in \mathcal{P}\}$. $\forall i \in \mathcal{P}$ can mean that there is one pair $(c_i, m_i)$ for each vRAP i contained in set $\mathcal{P}$, which can be simple a set collecting all vRAPs in the system.

Referring to FIGS. 5-8, the processing system can produce action matrix (e.g., vector) an by aggregating the output of the CPU allocator 520 (e.g., $c_{n,i}$) with the output of the radio selector 540 (e.g., $m_{n,i}$). CPU allocator 520 in FIGS. 5-8 can correspond to CPU scheduler 422 in FIG. 4 and operate by feeding a first encoded input (produced by encoder 440) into a CPU model 522 (e.g., a CPU neural network). Radio selector 540 in FIGS. 5-8 can correspond to VRAP scheduler 428 in FIG. 4 and operate by feeding the first encoded input (produced by encoder 440) and a classification (e.g., a vector encoding a classification) produced by CPU allocator 520 into each of one or more radio models 542 (e.g., one or more radio neural networks).

The processing system can allocate resources based on action $a_n$ by instantiating or terminating virtual machines, expanding or narrowing (adjusting) hardware processing resources devoted to each of the virtual machines, and scheduling resource blocks (scheduling spectrum for specific tasks). Challenges applicable to this model can include: (i) a high-dimensional contextual space, and (ii) a fluid (or large, when discretized) action space.

To address the first challenge, and referring to FIGS. 4-8, the processing system can apply the encoding module 440 (also called an encoder) to map context $x_n \in \chi$ into a lower-dimensional representation $y_n \in \mathbb{R}^E$ with $\mathbb{E} < \dim(\chi)$ with an encoding (e.g., embedding) function $e(x_n)$, which can be a pre-trained neural network. To accommodate encoded contexts, the processing system can let: $\hat{\pi} \mathbb{R}^E \to \mathcal{A}$ be the corresponding function mapping $y_n = e(x_n)$ into an action in $\mathcal{A}$ and redefine $\Pi = \{\pi: \chi \to \mathcal{A}, \pi(x) = \hat{\pi}(e(x))\}$.

In some embodiments, the encoding function $e(x_n)$ can fuse (also called blend or synthesize) input data of multiple modalities (e.g., the CQI and RLC buffer data) such that the lower-dimensional representation has a single modality. Therefore, each value present within the output of the encoding function can encode a piece of information from every input modality. As a result, both the CPU allocator 520 and the radio selector 540 can operate on the entire output of the encoding function (e.g., be configured to convolve over each value of the encoding output) as opposed to operating on discrete sectors thereof.

The processing system can address the second challenge through the controller module 450 in FIG. 4 (which can correspond to the combination of the CPU allocator and radio selector in FIGS. 5-8) by implementing different methods depending on the objective (non-QoS driven or QoS driven) and operator preferences.

Figure 5:
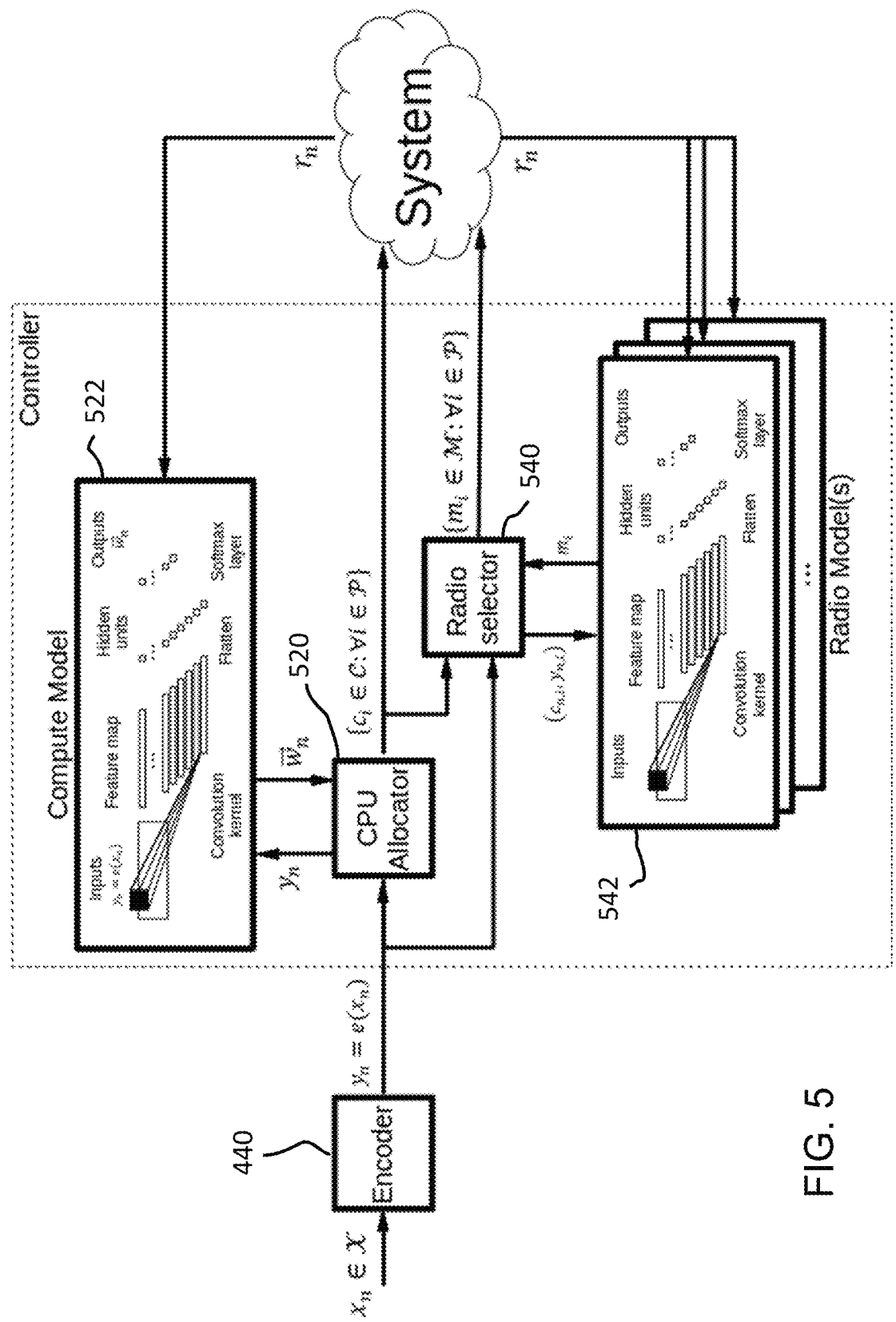
FIG. 5 is a schematic overview of an exemplary policy manager type A which, according to some embodiments, is not driven by quality of service (QoS).
Figure 6:
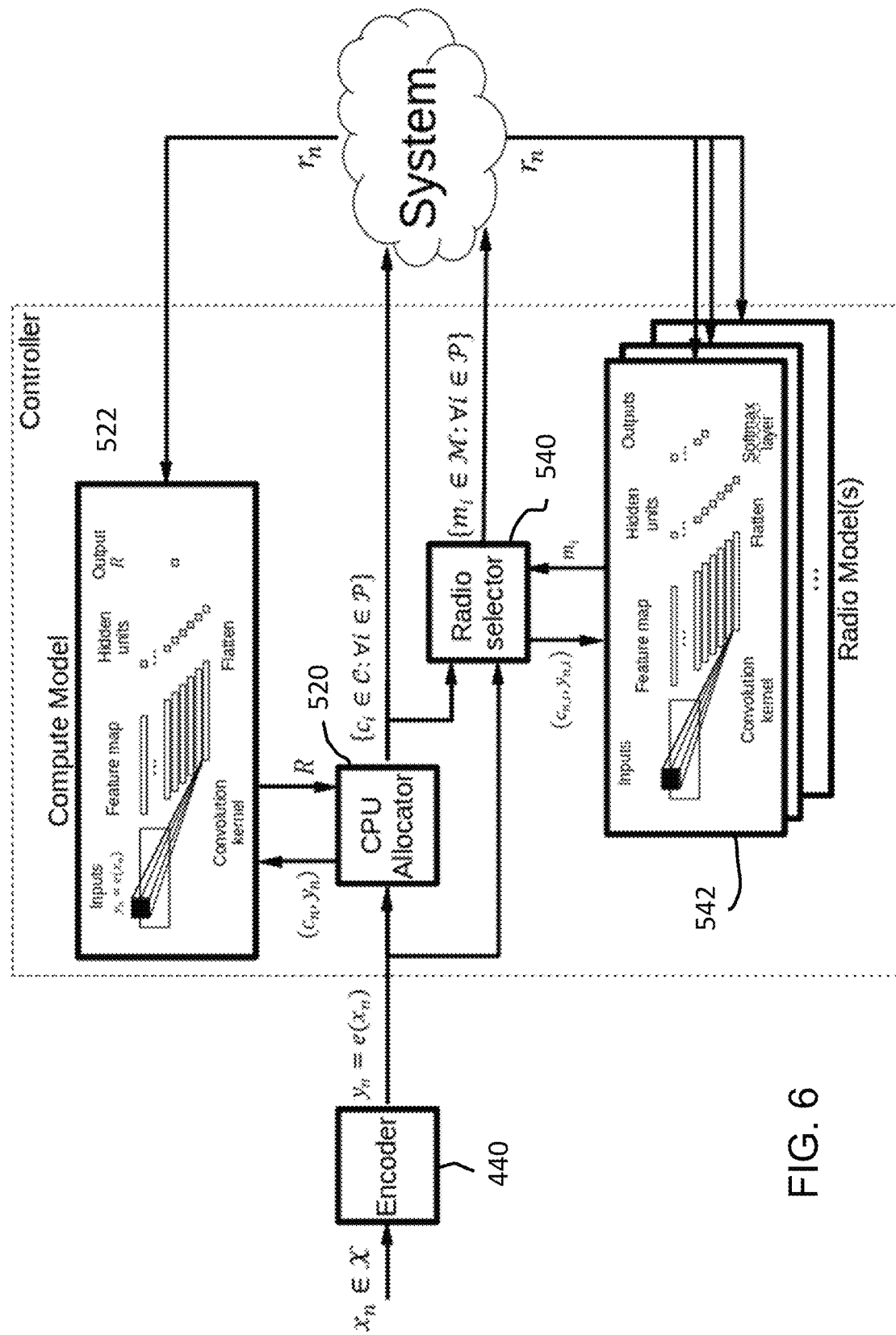
FIG. 6 is a schematic overview of a policy manager type B which, according to some embodiments, is not driven by QoS.

FIGS. 5 and 6 each show a non-QoS driven method according to an embodiment. In the absence of QoS targets (e.g., a target average delay per RAP), the processing system can be configured to strike a predetermined balance between system cost and individual RAP performance. FIG. 5 shows a first method type A (direct) and FIG. 6 shows a second method type B (indirect).

In the first method type A (direct), and as shown in FIG. 5, a CPU allocator can receive an encoded context matrix (e.g., vector) $y_n$ and apply a learned compute model $$f_c: y_n \to \operatorname*{argmax}_{\vec{w}_n} R,$$

where R is the expected instantaneous reward $R := \mathbb{E}[r_n]$ and $\vec{w}_n \in \{(w_{n,k} \in \mathbb{R}: \Sigma w_{n,k} = 1, k \in \{0, 1, \ldots |\mathcal{P}|\}\}$ is a computing weight matrix (e.g., vector). If C is defined to range between 0 and 1, then $w_n$ can be equal to $c_n$. But in an embodiment, C can range between 0 and any integer (since the processing system can have multiple cores). Vector $w_n$ can always exist between 0 and 1 and represent the relative share of the available processing resources in the system. Note that $|\vec{w}_n| = |\mathcal{P}| + 1$ to include a virtual RAP representing "free compute time", i.e., computing time not allocated to any vRAP. In this case, an example of a reward function is: $r_n := \Sigma_{i \in \mathcal{P}} -c_{n,i} - \alpha \log d_{n,i}$ where $d_{n,i}$ and $c_{n,i}$ are system state variables that capture, respectively, the average delay (which can be indexed as RLC buffer lengths) across all users of $vRAP_i$ and the average computational load incurred by $vRAP_i$ in the current time step n $\mathcal{P}$ can be a set containing the index of all vRAPs in the system. Therefore, the length of vector w can be equal to the number of vRAPs in the system plus 1 to account for resources that are not allocated to any vRAP. $\Sigma_{w_{n,k}}$ can be equal to 1 to ensure that the 100% of the CPU resources are assigned to some RAP 1 or unallocated (the plus 1 element).

Parameter $0 \leq \alpha \leq 1$ can be a tunable parameter that enables the operator to balance the relative importance given to user delay performance over overall operating cost (or vice versa). In some embodiments, the processing system can dynamically adjust the parameter based on cloud computing costs (e.g., electricity price).

The compute model $f_c$ can be implemented through a neural network 522 (e.g. a convolutional neural network including a fully-connected softmax output layer, as shown in FIG. 5). A fully connected softmax output layer can guarantee that $\Sigma w_{n,k} = 1$. In this way, the compute model can classify an input context matrix (e.g., vector) into a weighting matrix (e.g., vector) $w_n$ that maximizes expected reward $r_n$. Vector $w_n$ can include as many elements as vRAPs in the system. An element from vector $w_n$ can be $w_{n,k}$.

Training can be performed by randomizing the weighting vectors and using a subgradient ascent algorithm to optimize the parameters of the neural network such that reward is maximized. A pre-training process can be performed before the system is in operation. During operation, the processing system can interleave training (exploration) and exploitation phases with, for instance, an epsilon-greedy algorithm where the processing system explores (randomizing the weighting matrix (e.g., vector)) with probability E and exploits (using the computed weighting) matrix (e.g., vector) with probability 1-ε. Ultimately, compute allocations can be calculated as $c_{n,i} = w_{n,i} \cdot C$ where C is the total compute capacity of the edge computing infrastructure (e.g., the total number of CPUs).

Another option for the processing system to host the compute model $f_c$ is to implement per-RAP models (with a single output each) recommending a single $w_{n,i}$ for each RAP in a distributed manner, $$f_{c,i}: y_{n,i} \to \operatorname*{argmax}_{\vec{w}_{n,i}} R_i.$$

with $R_i$ being the individual expected reward. In such a case, the CPU allocator can implement an (heuristic) algorithm that arbitrates when $\Sigma_{i \in \mathcal{P}} w_{n,i} > 1$. The choice of this distributed model or a centralized model can depend on the user's preference in the complexity vs. accuracy tradeoff.

Once a compute allocation (also called a processing resources allocation) is calculated, the processing system can feed the selected $c_{n,i}$ into a radio selector having a radio model $f_{r,i}: (c_{n,i}, y_{n,i}) \to m_{n,i}$ that maps $(c_{n,i}, y_{n,i})$ into the maximum MCS (or any other radio policy such as mean MCS or maximum transmission time) allowed by such compute allocation. There can be at least one model per RAP type to capture the heterogeneity across RAPs shown in FIG. 1.

The radio model can be implemented using a radio neural network 542 for classification (e.g. a convolutional neural network including a fully-connected softmax output layer indicating the probability of an MCS being the maximum allowed by the selected $c_{n,i}$ in the current context $y_{n,i}$ as shown in FIG. 5). Similarly, this model can be pre-trained offline or during operation by alternating exploration and exploitation phases.

An alternative method type B (indirect) is depicted in FIG. 6. In this case, the compute model $f_c$ can approximate function $f_c: (c_n, y_n) \to R$ and the CPU allocator can be configured to solve the following (non-linear) knapsack prompt:

$$\max_{\{c_i\}} R$$
$$\text{s.t.} \sum_{i \in \mathcal{P}} c_i \leq C, \forall i \in \mathcal{P}$$

The processing system can solve the knapsack problem by polling $f_c$ on demand within a branch-and-bound method, decomposition algorithms (e.g. Benders method), greedy heuristics or general methods such as simulated annealing or genetic algorithms. In this case, model $f_c$ can be (pre)trained using, e.g., the following mean squared error (MSE) loss function:

$$Loss_n := \frac{1}{n} \Sigma_{m=1}^{n} (R_m - r_m)^2$$

and can include some regularization penalties standard in neural network based function approximators. Other loss functions commonly used in function approximation problems can also be used, e.g. (mean absolute error, mean squared logarithmic error, etc.).

The compute model can be implemented per RAP-type in a distributed fashion. In such a case, the processing system can host a model per RAP $f_{c,i}(c_{n,i}, y_{n,i}) \to R_i$ with $R_i$ being the individual expected reward, which can be trained (and polled by the CPU allocator) individually. The choice of this distributed model or a centralized model can depend on the operator's preference on the complexity vs. accuracy tradeoff. The remaining functional blocks of the policy manager shown in FIG. 6 remain the same as in type A.

Figure 7:
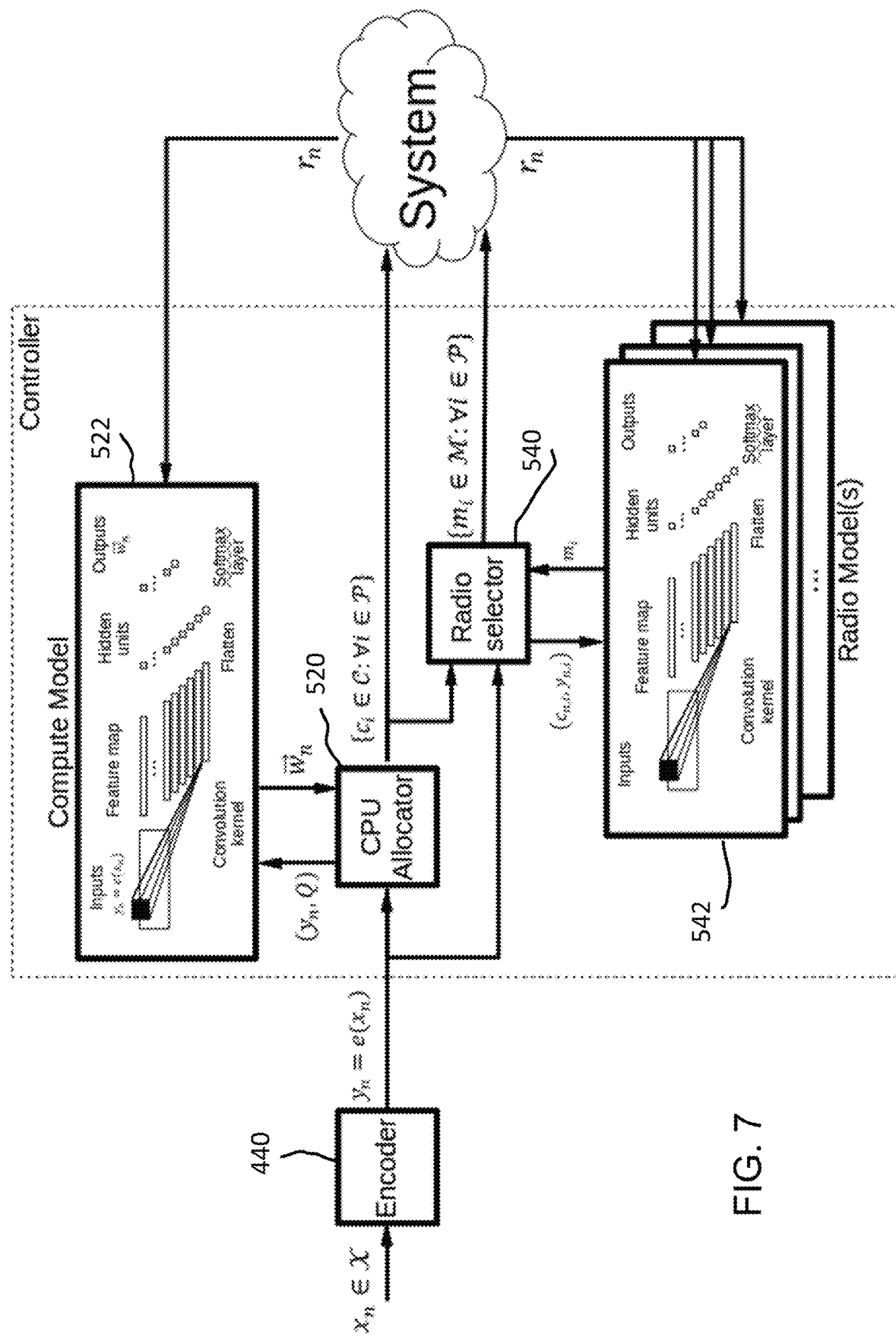
FIG. 7 is a schematic overview of a policy manager type A which, according to some embodiments, is driven by QoS.
Figure 8:
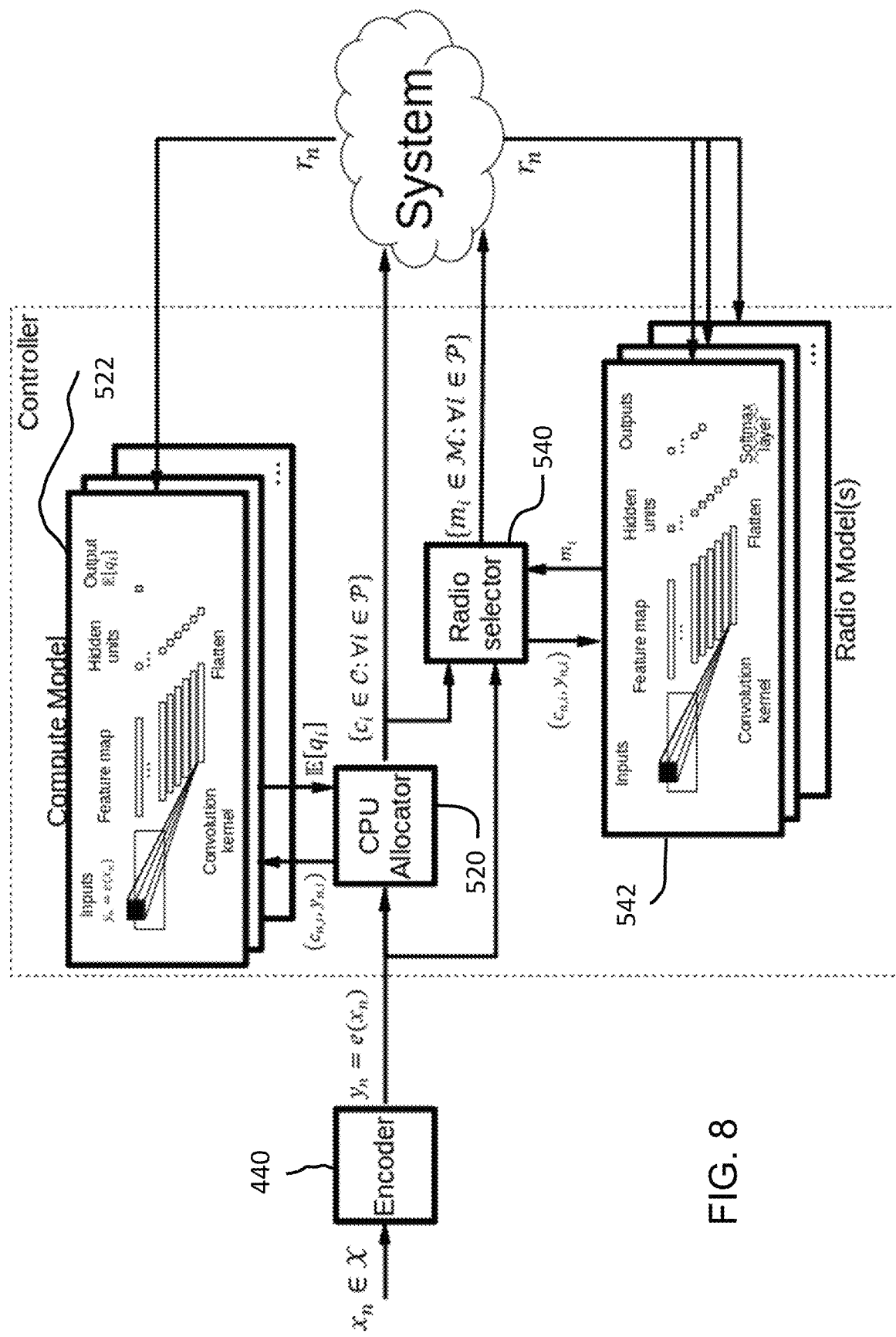
FIG. 8 is a schematic overview of a policy manager type B which, according to some embodiments, is driven by QoS.

FIGS. 7 and 8 each show QoS driven method according to an embodiment. These two methods address a scenario when vRAPs have QoS targets $Q_i$. An example of a QoS target $Q_i$ is an expected maximum length of RLC buffers (or delay). FIG. 7 shows a first method type A (direct) and FIG. 8 shows a second method type B (indirect).

The first method type A can target per-RAP QoS constraints while minimizing operational costs (minimizing the amount of compute resources allocated). A QoS constraint $q_i$ can be a maximum mean delay target, for instance. This can be addressed by modifying the CPU model presented in FIG. 5 to approximate the following function $$f_c : (y_n, Q) \to \mathop{\mathrm{argmax}}_{\vec{w}_n} R,$$

with $R := \mathbb{E}[\Sigma_{n=0}^{\infty} \gamma \cdot r_n]$, $\gamma$ being a discounted factor, and $r_n :=$ formula A (see below) for QoS criteria that must be higher than a threshold (e.g. throughput), or $r_n :=$ formula B (see below) for QoS criteria that must be lower than a threshold (e.g. delay), where $g_{n,i}$ is the QoS measured by RAP i at time step n. Other reward functions typical of reinforcement learning could be applied.

$$r_n := \begin{cases} \sum_i (q_{n,i} - Q_i)^2, & q_{n,i} \geq Q_i \\ -1, & q_{n,i} < Q_i. \end{cases} \quad \text{Formula A}$$

$$r_n := \begin{cases} \sum_i (q_{n,i} - Q_i)^2, & q_{n,i} \leq Q_i \\ -1, & q_{n,i} > Q_i. \end{cases} \quad \text{Formula B}$$

As depicted in FIG. 7, $f_c$ can be built using a neural network architecture similar to the presented in FIG. 5, with a system of neural networks (such as a convolutional network and a fully-connected layer in series) that ends in a softmax layer that outputs a weighting matrix (e.g., vector) $\vec{w} \in \{(w_{n,i} \in \mathbb{R}) : \Sigma w_{n,i} = 1, l \in \{0, 1, \ldots |\mathcal{P}|\}\}$. Then, the processing system can compute the respective compute policy as $c_{n,i} = w_{n,i} \cdot C$ where C is the total compute capacity of the edge computing infrastructure. Similarly, this neural network can be (pre)trained randomizing the weighting matrix (e.g., vector) and using subgradient ascent on the reward function, and can alternate training (or exploration) phases and exploitation phases during operation. In an embodiment, $w_{n,i} = w_{n,k}$.

As previously discussed, the compute model can be distributed across all RAP types to mitigate complexity, $$f_{c,i} : (y_{n,i}, Q_i) \to \mathop{\mathrm{argmax}}_{\vec{w}_{n,i}} R_i,$$

with $R_i$ the expected individual reward. In such a case, the controller can arbitrate in scenarios when $\Sigma_{i \in \mathcal{P}} w_{n,i} > 1$ with a heuristic algorithm. The choice of this distributed model or a centralized model depends on the user's preference on the complexity vs. accuracy tradeoff. The remaining functional blocks of the policy manager shown in FIG. 7 remain the same as the non-QoS methods.

FIG. 8 shows the architecture of an alternative method type B. In this case, the controller can make use of function approximators $f_{c,i}: (c_{n,i}, y_{n,i}) \to \mathbb{E}[q_{n,i}]$ where $q_{n,i}$ is the QoS measured by RAP i at time step n and $\mathbb{E}[q_{n,i}]$ its expectation. Alternatively, a single function approximator $f_c: (c_n, y_n) \to \mathbb{E}[\vec{q}_n]$ that outputs a matrix (e.g., vector) of measured QoS for each RAP can be used. Then, the controller polls $f_{c,i}$ (or $f_c$) on demand in an algorithm that solves the following Knapsack prompt variant.

$$\min_{\{c_i\}} \sum_{i \in \mathcal{P}} c_i$$
$$\text{s.t. } \mathbb{E}[q_i(c_i, y_i)] \geq Q_i, \forall i \in \mathcal{P}$$
$$\sum_{i \in \mathcal{P}} c_i \leq C, \forall i \in \mathcal{P}$$

The system can solve this problem by polling $f_{c,i}$ (or $f_c$) on demand within a branch-and-bound method, decomposition algorithms (e.g. Benders method), greedy heuristics or general methods such as simulated annealing or genetic algorithms. An example of such heuristic is the following:

(1) Set $\delta$ (to a small value), set $c_i=0$ for all $i \in \mathcal{P}$, and set $S:=\{1 \ldots |\mathcal{P}|\}$.

(2) While $\Sigma_{i \in \mathcal{P}} c_i \leq C$ and $S \neq \emptyset$ (a) Choose $i \in \mathcal{P}$ with highest $\mathbb{E}[q_i(c_i+\delta, y_i)] - \mathbb{E}[q_i(c_i, y_i)]$ (b) Set $c_i \leftarrow c_i + \delta$ (c) If $\mathbb{E}[q_i(c_i, y_i)] \geq Q_i$, then remove i from S: $S \leftarrow S \setminus \{i\}$.

In this case, model $f_c$ can be (pre)trained using, e.g., the following MSE loss function:

$$\text{Loss} := \frac{1}{n} \Sigma_{m=1}^n \Sigma_{i \in P}(E[q_{m,i}] - q_{m,i})^2$$

and can include regularization penalties standard in neural network based function approximators. Other potential loss functions include mean absolute error, mean squared logarithmic error, etc.

Embodiments of the invention enable the following improvements and advantages: (1) Scheduling resources according to joint policies in a radio communication system comprised of multiple transmitters connected with one out of multiple vRAPs running on a common cloud-based computing infrastructure, including: (a) Scheduling time-spectrum resources to radio data transmissions; (b) Selecting a modulation and coding scheme of the radio data transmissions; and (c) Assigning compute resources to received radio data transmissions for demodulation and decoding. (2) Managing radio and compute policies by dynamically learning a model that relates users' contextual information (such as signal quality and demand for data delivery variations) with radio and compute policies that jointly maximize a system reward. (3) Cost and resource efficiency of edge cloud radio access network deployments by learning a model that relates compute and radio resource demands. In contrast, existing approaches compute and radio scheduling decisions in a decoupled manner that is highly inefficient or uses a pre-calibrated model that operates optimally only in a limited number of scenarios. In this way, it is possible to optimize utilization of resources in any conditions and to adapt to changes in the environment, hardware or software updates, etc.

In an embodiment, the invention provides a method for assigning resources in a radio communication system comprised of multiple transmitters connected with one out of multiple vRAPs running on a common cloud-based computing infrastructure, the method comprising: (1) Acquiring contextual information from multiple transmitters, including signal-to-noise temporal variations and data demand temporal variations; (2) Selecting radio and compute scheduling policies accordingly; (3) Assigning received data transmissions to compute resources based on the compute scheduling policy; (4) Assigning buffered data transmissions to radio resources based on the radio scheduling policy; (5) Selecting a modulation and coding scheme to data transmissions based on the radio scheduling policy; and (6) Measuring performance indicators, such as data transmission delays, frame (e.g., subframe) decoding errors, computational load, etc.

In an embodiment, a performance metric is computed from performance indicators and fed into the system. The performance metric can be fed to a reinforcement learning model.

According to an embodiment of the invention, the learning phase, which can require time until the system makes optimal decisions, can be alleviated by pre-calibrating the learning model in a laboratory and letting the system adapt in production (so it does not have to learn from zero).

Figure 9:
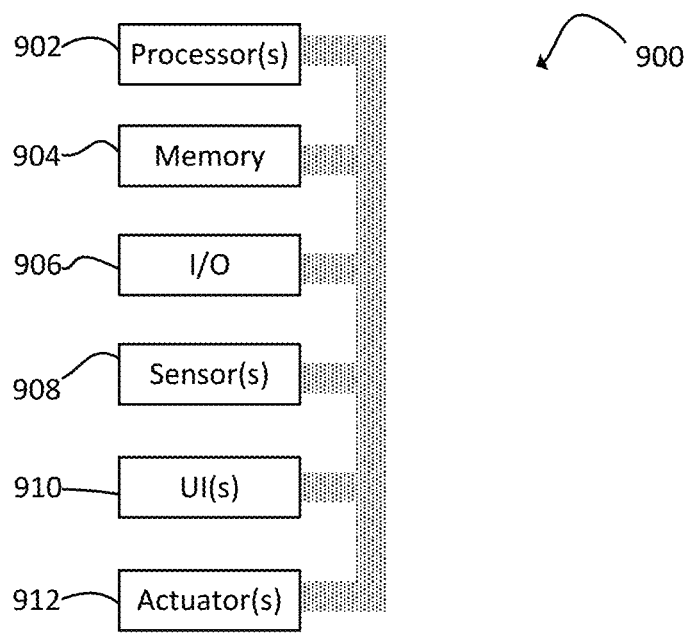
FIG. 9 is a block diagram of an exemplary processing system.

FIG. 9 depicts an exemplary processing system 900, which can include one or more processors 902, memory 904, one or more input/output devices 906, one or more sensors 908, one or more user interfaces 910, and one or more actuators 912. As further addressed below, processing system 900 can be configured to perform any and all operations disclosed in the present application.

Processors 902 can include one or more distinct processors, each having one or more cores. Each of the distinct processors can have the same or different structure. Processors 902 can include one or more central processing units (CPUs), one or more graphics processing units (GPUs), circuitry (e.g., application specific integrated circuits (ASICs)), digital signal processors (DSPs), and the like. Processors 902 can be mounted on a common substrate or to different substrates.

Processors 902 are configured to perform a certain method (framework, function, operation, etc.) at least when one of the one or more of the distinct processors is capable of executing code (e.g., interpreting scripts), stored on memory 904 embodying the function, method, or operation. Processors 902, and thus processing system 900, can be configured to automatically perform any and all functions, methods, and operations disclosed herein. Thus, any user (e.g., operator) identified herein can be embodied as a processing system configured to automatically perform the operations associated with the user.

When the present disclosure states that processing system 900 performs/can perform task "X", a user performs task "X", or task "X" is performed, such a statement should be understood to disclose that processing system 900 can be configured to perform task "X". Processing system 900 are configured to perform a function, method, or operation at least when processors 902 are configured to do the same.

Memory 904 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 904 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code (e.g., scripts) saved in memory 909.

Input-output devices 906 can include any component for trafficking data such as ports, antennas (transceivers), printed conductive paths, and the like. Input-output devices 906 can enable wired communication via USB®, DisplayPort®, HDMI®, Ethernet, and the like. Input-output devices 906 can enable electronic, optical, magnetic, and holographic, communication with suitable memory 906. Input-output devices 906 can enable wireless communication via WiFi®, Bluetooth®, cellular (e.g., LTE®, CDMA®, GSM®, WiMax®, NFC®), GPS, and the like. Input-output devices 906 can include wired and/or wireless communication pathways such as radio access points (RAPs). Input-output devices 906 can include wired and/or wireless communication pathways for transferring data to and from RAPs, but not the RAPs themselves.

Sensors 908 can capture physical measurements of environment and report the same to processors 902. User interface 910 can include displays (e.g., LED touchscreens (e.g., OLED touchscreens), physical buttons, speakers, microphones, keyboards, and the like. Actuators 912 can enable processors 902 to control mechanical forces.

Processing system 900 can be distributed. Processing system 900 can have a modular design where certain features have a plurality of the aspects shown in FIG. 9. For example, I/O modules can include volatile memory and one or more processors. Processing system 900 can include processors 902 mounted within radio access points (RAPs). In other embodiments, processing system 900 can exclude any components mounted to RAPs.

The appendix/attachment to U.S. Provisional Patent Application No. 62/817,024 entitled "vrAIn: A Deep Learning Approach for Computing and Radio Resource Control in Virtualized RANs" provides further description of exemplary embodiments of the invention, and is hereby incorporated by reference. Additionally, the following disclosure provides further description of exemplary embodiments of the invention.

1. Introduction to Additional Exemplary Embodiments

The virtualization of radio access networks (vRAN) is a milestone to be conquered. A major challenge is to allocate compute resources (in addition to radio resources) to the virtualized Radio access points; the dependency between compute resources and radio channel conditions makes this particularly daunting.

We present exemplary embodiments of vrAIn, a vRAN dynamic resource controller that builds upon deep reinforcement learning. First, in an embodiment, vrAIn uses an autoencoder that projects the large context space (traffic and signal quality patterns) into a latent representation. Then, in an embodiment, vrAIn uses a deep deterministic policy gradient (DDPG) algorithm, implemented by an actor-critic neural network structure, and a simple classifier to map (encoded) contexts into appropriate resource control decisions.

We implement an embodiment of vrAIn using srsLTE, an open source LTE stack, over different platforms. Our results show that vrAIn successfully derives, given a RAN configuration, appropriate compute allocations irrespective of the hardware platform and context. Moreover, vrAIn allows to trade-off RAN performance for cost savings in resource-constrained environments by a customizable reward function.

Radio Access Network virtualization (vRAN) is well recognized as a key technology to accommodate the ever-increasing demand for mobile services at affordable cost for mobile operators. vRAN centralizes softwarized radio access point (RAP) stacks into commodity computing infrastructure in a cloud location (typically at the edge). This provides several advantages, such as resource pooling (via centralization), simpler update roll-ups (via softwarization) and cheaper management and control (via commoditization).

There is a wide consensus among the research and industrial communities on the advantages of vRAN solutions. Important telecommunications operators, manufacturers, and research leaders have initiatives towards fully programmable, virtualized and open RAN solutions based on general-purpose processing platforms (GPPP).

Despite the above, the gains attainable today by vRAN are far from optimal. Indeed, computing resources are inefficiently pooled since most implementations over dimension computational capacity to cope with peak demands in real-time workloads. Conversely, substantial cost savings can be expected by dynamically adapting the allocation of resources to the temporal variations of the demand across vRAPs. Nonetheless, there is limited hands-on understanding on the computational behavior of vRAPs and the relationship between radio and compute resource dynamics.

Towards a cost-efficient resource pooling. Dynamic computing resource allocation in a vRAN system is an inherently hard problem because: First, the computational behavior of vRAPs depends on many factors, including the radio channel or user demand. More specifically, there is a strong dependency with the context (such as data bit-rate load and signal-to-noise-ratio (SNR) patterns), the RAP configuration (e.g., bandwidth, MIMO setting, etc.) and on the infrastructure pooling computing resources. Second, upon compute capacity shortage, computing resource control decisions and radio resource control decisions (such as user scheduling and modulation and coding selection) are coupled; indeed, it is well known that scheduling users with higher modulations and coding schema (MCS) incur in higher instantaneous computational load.

Figure 10:
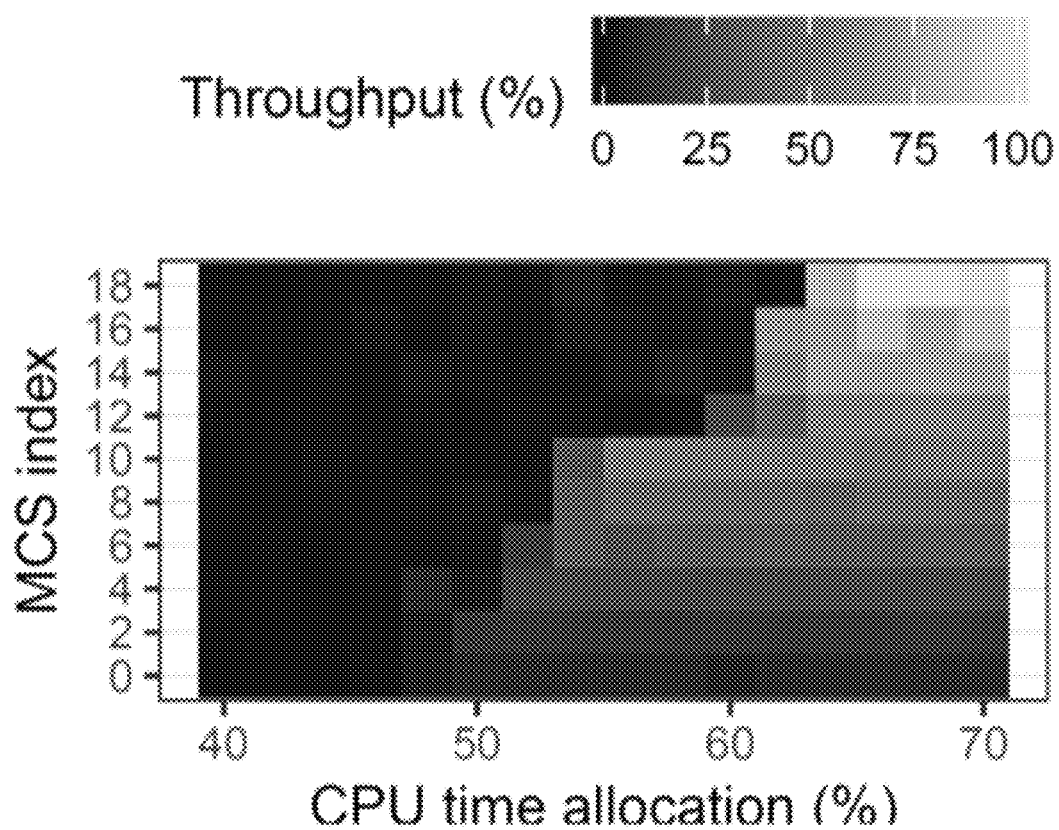
FIG. 10 shows an exemplary SISO 10-MHz LTE vRAP running on a laptop and a backlogged UE. Uplink throughput performance is shown at maximum load and high SNR.

We set up a regular LTE user equipment (UE) and a vRAN system comprised of srsLTE, an open source LTE stack, and a software defined radio (SDR) USRP. We let the UE transmit uplink UDP data at full buffer with high SNR channel conditions and measure the ratio of bits successfully decoded (throughput) when selecting different MCS indexes (y axis) and relative CPU time shares (x axis). The results, depicted in FIG. 10, yield an observation: higher modulation levels achieve higher performance which in turn require higher allocation of computing resources. This dependency motivates us to (i) devise algorithms to adjust the allocation of computing resources to the needs of a vRAN; and (ii) upon shortage of computing resources, explore strategies that make compute/radio control decisions jointly.

Model-free learning. The aforementioned issues have been identified in some related research. However, these works rely on models that need (pre-)calibration for specific scenarios and they do not consider the effect that different bit-rate patterns have on computing resource utilization. In reality, however, the relationship that system performance has with compute and radio scheduling policies is far from trivial and highly depends on the context (data arrival patterns SNR patterns) and on the software implementation and hardware platform over which the vRAP stack runs.

Figure 11:
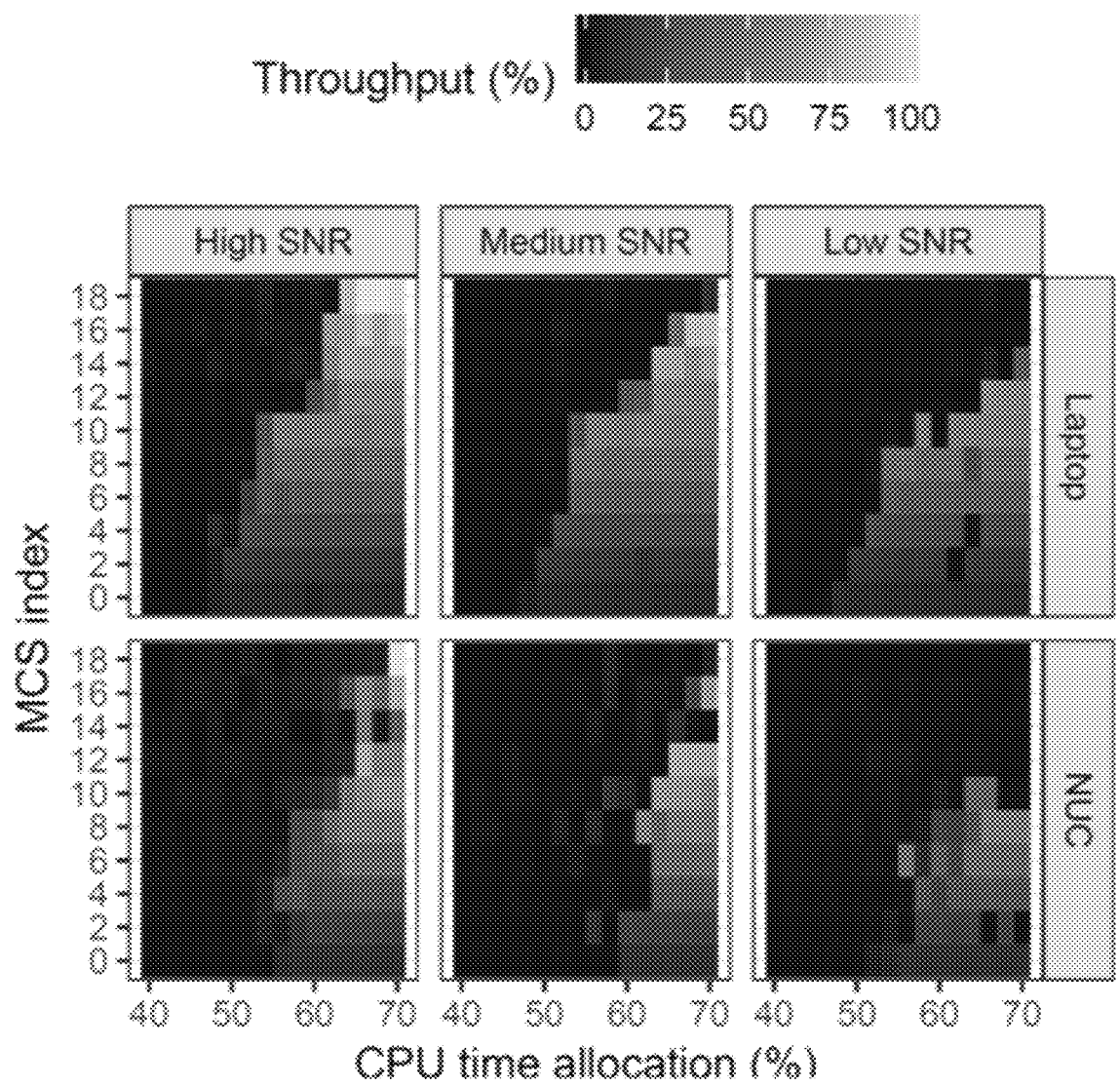
FIG. 11 shows an exemplary SISO 10-MHz LTE vRAP and a backlogged UE. Uplink throughput is shown at full buffer.
Figure 12:
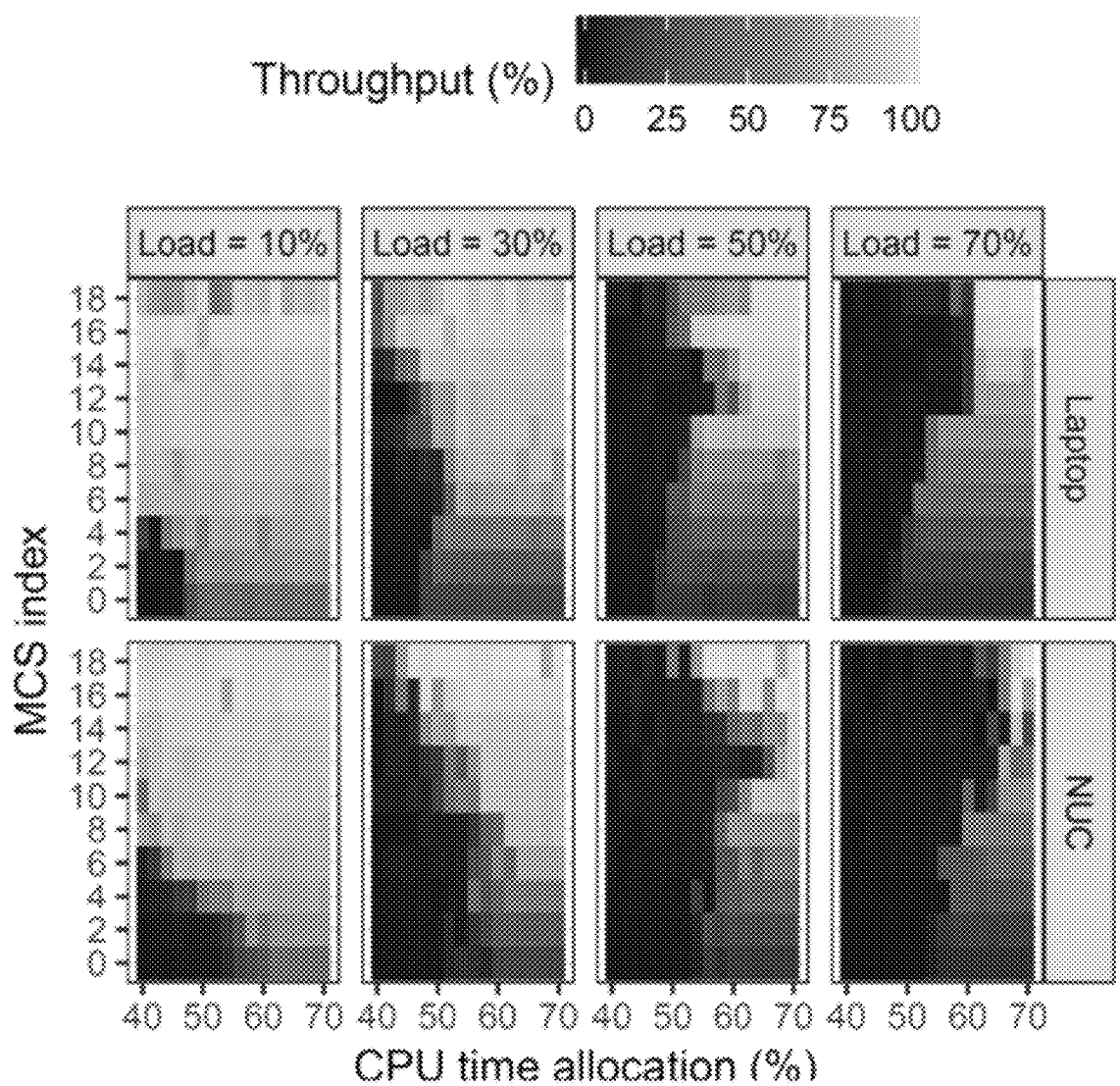
FIG. 12 shows an exemplary SISO 10-MHz LTE vRAP and a backlogged UE. Uplink throughput is shown at high SNR.

To emphasize the above point, we repeat the previous experiment for different SNR regimes (high, medium and low) and different mean bit-rate load regimes (10%, 30%, 50% and 70% of the maximum nominal capacity) for two different compute infrastructures, the laptop used before and a 4-core i7-CPU Intel Next Unit Computing (NUC) board, and show the achieved throughput relative to the load in FIG. 11 (full buffer, variable SNR) and FIG. 12 (high SNR, variable load). The results make it evident that the system behavior shown in FIG. 10 substantially varies with the context (SNR, bit-rate load) and the platform pooling computing resources All the above render tractable models previously proposed in the literature inefficient for practical resource control. In contrast, we resort to model-free reinforcement learning methods that adapt to the actual contexts and platforms. We hence present vrAIn, an autonomous resource controller for vRAN systems that:

Encodes contextual data from a high-dimensional space into its latent representation; Autonomously makes sequential resource control decisions by mapping (encoded) contexts into joint compute and radio control actions; and learns high-performing mapping policies irrespective of the underlying infrastructure. The implementation of vrAIn described herein is only an exemplary embodiment of the invention.

Figure 13:
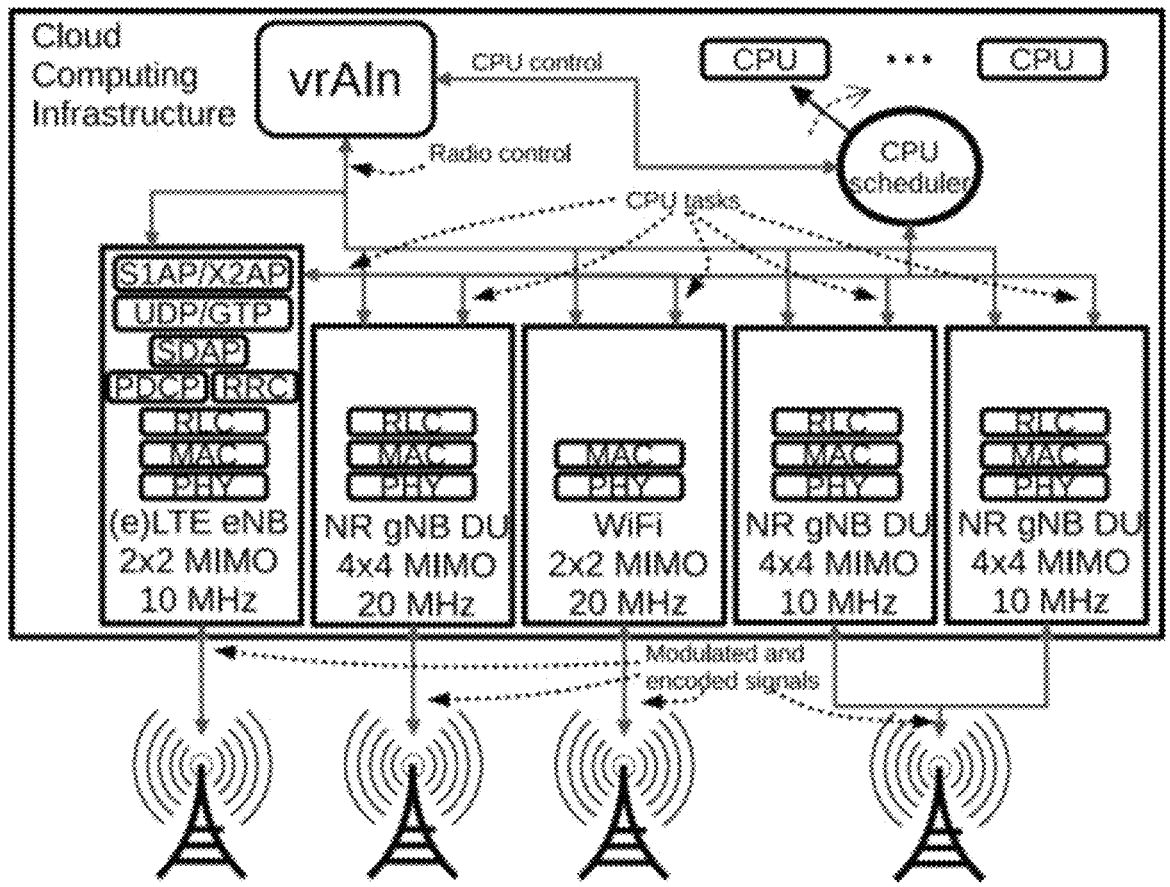
FIG. 13 shows an exemplary vrAIn: a vRAN resource controller

FIG. 13 illustrates the system scenario we consider. We explore empirically the computational behavior of a vRAN. Our results do not only shed light on the computational behavior of this technology, but also show that substantial gains can be achieved by developing autonomous learning algorithms that adapt to the current computing resources and radio channel.

2. Relevant Information 2.1 Radio Access Point

A radio access point (RAP) implements the necessary processing stack to transfer data to/from UEs. These stacks may be heterogeneous in nature (4G LTE, WiFi, unlicensed LTE, 5G New Radio) and/or implement different functional splits (see FIG. 13), but they all have several fundamentals in common, such as OFDMA modulation schemes and channel coding techniques at the physical layer (PHY) that make vrAIn general across these vRAPs. FIG. 13 depicts the protocol stack of several RAPs, including (from left to right) (enhanced) LTE, NR gNB, WiFi and two NR gNBs sharing common radio front-end (slicing).

The data plane of a RAP is typically dissected into two layers (L1, L2). In the following, we explain the relevant features that are relevant for the design of vrAIn.

L1 (PHY). We focus on sub-6 GHz PHY bands, specifically on the uplink of 3GPP 4G LTE and 5G NR since it is the more complex case as we have to rely on periodic feedback from users (the extension to downlink is straightforward as user buffers are local). In 4G LTE and 5G NR, L1 data and control planes are implemented through a set of OFDMA-modulated channels, using a Resource Block (RB) filling across 10-ms frames divided into ten 1-ms subframes. The channels used for the heavy lifting of user data are the Physical Uplink Shared Channel (PUSCH) and the Physical Downlink Shared Channel (PDSCH), usually modulated with QAM and different constellation sizes (up to 256 in 5G) and encoded with a turbo decoder (4G) or LDCP codes (5G). There are additional differences between 4G and 5G PHYs, such as 5G's scalable OFDM numerology (e.g. configurable subcarrier spacing), but these are not relevant to vrAIn, which simply learns their computational behavior in a model-free manner. In brief, RBs are assigned to UEs by the MAC layer and are modulated and encoded with an MCS that depends on the user's Channel Quality Indicator (CQI), a measure of SNR (downlink CQI is reported periodically by UEs). A scheme to map a CQI value into an appropriate MCS is a common MCS selection mechanism and is blind to computing resource availability.

L2 (MAC, RLC, PDCP). The MAC sublayer is responsible for (de)multiplexing data from/to different radio bearers to/from PHY transport blocks (TBs) and perform error correction through hybrid ARQ (HARD). In the uplink, the de-multiplexing is carried out by the MAC scheduler that selects the assignment of RBs to UEs at every scheduling interval (TTI, usually equal to 1 ms). Once this is decided, the RAP feeds the in-formation to the UEs through a scheduling grant. In this case, the UE still has the freedom to choose which bearers get served by which RBs within the allocated grant. Beyond defining two classes of schedulers (semi-persistent and non-persistent), 3GPP leaves the scheduler design open for vendor implementation. The higher sublayers (RLC, PDCP) perform tasks such as data reordering, segmentation, error correction and cyphering; and provide a common reference point towards different PHY/MAC instances (e.g., from different vRAPs). Another L2 aspect relevant for the design of vrAIn are the Buffer State Reports (BSRs), which provide feedback to the RAPs about the amount of data each UE has pending to transmit. This information will be used by vrAIn to design a system state signal used for feedback on resource allocation decisions.

Importantly, PHY (de)modulation and (de)coding operations, which are present in one way or another across all RAPs, consume most of the CPU cycles of a vRAP, which explains the dependency between computing resources and MCS illustrated in § 1. PDCP's (de)ciphering operations consumes most of the CPU cycles in L2, although L2 is substantially less compute demanding than L1 and PDCP will be decoupled from the distributed unit (DU) in 5G (see NR gNB in FIG. 13).

2.2 Notation

We let $\mathbb{R}$ and $\mathbb{Z}$ denote the set of real and integer numbers. We use $\mathbb{R}_+$, $\mathbb{R}^n$, and $\mathbb{R}^{n \times m}$ to represent the sets of non-negative real numbers, n-dimensional real vectors, and m×n real matrices, respectively. Vectors are usually in column form and written in bold font. Matrices are in upper-case font. Subscripts represent an element in a vector and superscripts elements in a sequence. For instance, $\langle x^{(t)} \rangle$ is a sequence of vectors with $x(t)=(x_1^{(t)}, \ldots, x_n^{(t)})^T$ being a vector from $\mathbb{R}_n$. In turn, $x_i^{(t)}$ is the i'th component of the t'th vector in the sequence. $\|x\|_2$ represents the 2-norm or Euclidean norm of x and $\|x\|_\infty$ its maximum norm ($\max_i |x_i|$). Finally, $[\bullet]^+$ denotes the projection of a vector onto the non-negative orthant, $[x]^+=(\max\{0, x_1\}, \ldots, \max\{0, x_n\})$, $x \in \mathbb{R}^n$.

3. vrAIn Design

Figure 14:
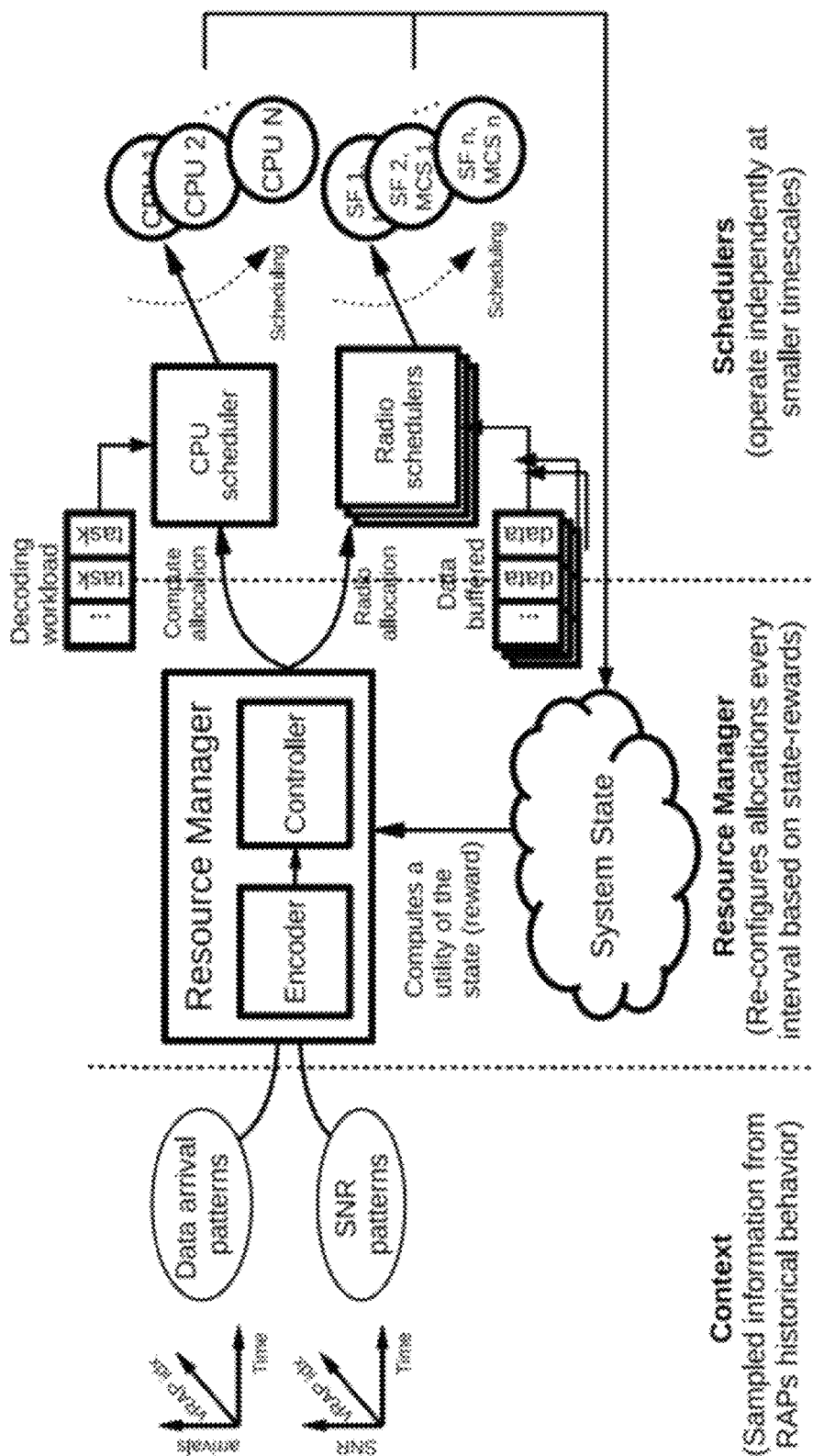
FIG. 14 shows an exemplary vrAIn system design.

An exemplary design of vrAIn is schematically depicted in FIG. 14. As shown by the figure, vrAIn (the exemplary embodiment of vrAIn) is divided into two blocks operating at different timescales:

In the first block, CPU schedulers (which assign tasks to CPUs, e.g., subframes for decoding) and radio schedulers (which assign radio resources to UEs, e.g., selecting MCSs and allocating RBs) operate at sub-millisecond scales. vrAIn relies on simple computing and radio control interfaces, discussed in § 3.1, to influence their behavior.

The second block is the resource manager, a sequential decision-making entity that configures the above schedulers using respective compute and radio control interfaces over larger timescales (seconds). To overcome the issues mentioned in § 1, the resource manager implements a feedback control loop where:

Contextual information (SNR and traffic load patterns) is collected; A learned policy maps contexts into computing and radio control decisions; and A reward signal assesses the decisions taken and fine-tunes the policy accordingly.

This falls into the realm of reinforcement learning (RL), an area of machine learning applied in human-level control (mastering games such as Go or StarCraft II), healthcare or finances. Full-blown RL problems are usually modeled using Markov decision processes and use some model-free policy learning method (e.g., Q-learning) to estimate an action-value function. However, the impact that instantaneous actions have on future contexts, where RL usually captures with the recursive Bellman equation, is very limited in our case because of the different timescales between the schedulers and the resource manager. Thus, we can resort to a contextual bandit (CB) model, a type of RL applied in health, advertisement, recommendation or robot control systems that can learn context-action mapping policies in a much simpler setup (without recursive action-value functions). challenges; among others, include continuous and high-dimensional context/action spaces. These issues are formally addressed in § 3.2.

3.1 CPU and Radio Schedulers

A goal is to use vanilla schedulers and/or require minimal customization when integrating vrAIn. This facilitates the implementation of the whole system (we can focus mostly on the resource manager) and deployability (we either require vanilla schedulers and/or perform minimal customization of readily available open source resource control tools such as Linux containers).

Computing resource scheduling implies assigning workloads such as subframes to decode to an available CPU. In turn, radio resource scheduling involves deciding upon the number of PRBs assigned to UEs, their location in frequency and time, their MCS and their transmission power. In order to be able to work with any existing scheduler, and thus generalize as much as possible the design of vrAIn, we rely on interfaces to control the underlying schedulers, which include in imposing for each RAP i a maximum computing time share $c_i \in C := [0,1] \subset \mathbb{R}$ (our computing control decisions) and a maximum MCS $m_i \in \mathcal{M}$ (our radio control decisions), where $\mathcal{M}$ is a discrete set of eligible MCS. These control settings are configured by the resource manager at each time interval, and can be easily applied to any scheduler of choice. Note that these are allocated resource upper bounds, the underlying schedulers still have the freedom to optimize the use of resources within their timescales.

Then, an objective is to design a resource manager that learns the behavior of any lower-level scheduler of choice and influence them via simple control interfaces. For instance, our platform implementation (properly presented § 4) uses vanilla Docker API for CPU resource control and a minimal modification of srsLTE, our vRAP proof-of-concept, to upper bound the set of eligible MCSs by the default radio scheduler.

3.2 Resource Manager

As mentioned above, we formulate our resource management problem as a contextual bandit (CB) problem, a sequential decision-making problem where, at every time interval $n \in \mathbb{N}$, an agent observes a context or feature vector drawn from an arbitrary feature space $x^{(n)} \in X$, chooses an action $a^n \in \mathcal{A}$ and receives a reward signal $r(x^{(n)}, a^{(n)})$ as feedback. The sequence of context arrivals $\langle x^{(n)} \rangle_{n \in \mathbb{N}}$ and the distribution E over context-reward pairs (x, r) are fixed and unknown a priori. Furthermore, we let $\pi(x): X \to \mathcal{A}$ denote a deterministic policy that maps contexts into actions, and $R_\pi := \mathbb{E}_{(x,r) \sim E}[r(x, \pi(x))]$ denote the expected instantaneous reward of a policy $\pi$. The goal is hence to learn an optimal policy $\pi^* := \arg\max_{\pi \in \Pi} R_\pi$ that maximizes instantaneous rewards subject to $\Sigma_{i \in P} c_i \leq 1$ to respect the system capacity.

Context space. As illustrated by our early experimental results in § 1, SNR channel conditions and network load are the contextual features that have most impact on performance. Thus, we divide the time between time interval n−1 and n into t:={1, 2, ..., T} monitoring slots and collect, at each slot t, the mean and variance SNR, $(\overline{\sigma}_{i,n}^{(t)}, \tilde{\sigma}_{i,n}^{(t)}) \in \mathcal{S}$ and the total amount of new bits pending to be transmitted $\delta_{i,n}^{(t)} \in \mathcal{D}$ between t−1 and t across all users attached to each RAP $i \in \mathcal{P}$, with $|\mathcal{P}| = P$. Then, at the beginning of each time interval n, we gather all monitoring samples into a sequence of mean-variance SNR pairs $s_i^n := \langle (\overline{\sigma}_{i,n}^{(t)}, \tilde{\sigma}_{i,n}^{(t)}) \rangle_{t=(1,2,...T)}$ and a sequence of network load $d_i^{(n)} := \langle \delta_{i,n}^{(t)} \rangle_{t=(1,2,...T)}$. In this way, we construct a context snapshot $x^{(n)} = \langle (s_i^{(n)}, d_i^{(n)}) \rangle_{\forall i \in \mathcal{F}}$ from feature space $X := \{(s, d)_{s \in \mathcal{S}, d \in \mathcal{D}}^{P \times T}\}$ every time interval n.

Action space. Our action space comprises all pairs of compute and radio control actions introduced in § 3.1. In this way, $c_i^{(n)} \in \mathcal{C}$ and $m_i^{(n)} \in \mathcal{M}$ denote, respectively, the maximum (relative) computing time (compute control action) and the maximum MCS (radio control action) allowed to RAP i in time interval n. We also let $c_0^{(n)}$ denote the amount of computing resource left unallocated. Consequently, an action $a^{(n)}$ includes of compute and radio control actions across all RAPs, $\mathcal{A} := \{(c_i \in \mathcal{C}, m_i \in \mathcal{M}).$ Reward function. As a design criteria, we aim at (i) in case there are sufficient compute resources for all RAPs, we want to provide the needed resources in order to have delays below a given target; and (ii) when running out of resources, we would like to distribute the resources across the different RAPs in such a way that delays are as close as possible to the target. To achieve such criteria, we design the reward function as follows. We let $q_i^{(n)} = (q_{i,n}^{(t)})_{\forall t \in \{1,...,T\}}$ describe the aggregate buffer states across all users of each RAP i at each monitoring slot t at each time interval n, and $Q_i$ describe a target buffer state for each RAP i. Thus, we let $$J_i(X^{(n)}, a^{(n)}) := \frac{1}{T} \sum_{t=1}^{T} Q_i - q_{i,n}^{(t)}$$

denote the (unknown) function that maps context-action pairs to a measure of our QoS criterion. In this way, we define the reward achieved at time interval n as: $r(x, a) := \Sigma_{i \in P} J_i(x^n, a^{(n)}) - \lambda c_i^{(n)}$ where $\lambda > 0$ is a system parameter set to a small value, with the goal of driving the consumption of computational resources to be as small as possible as long as the delay requirements are met.

Figure 17:
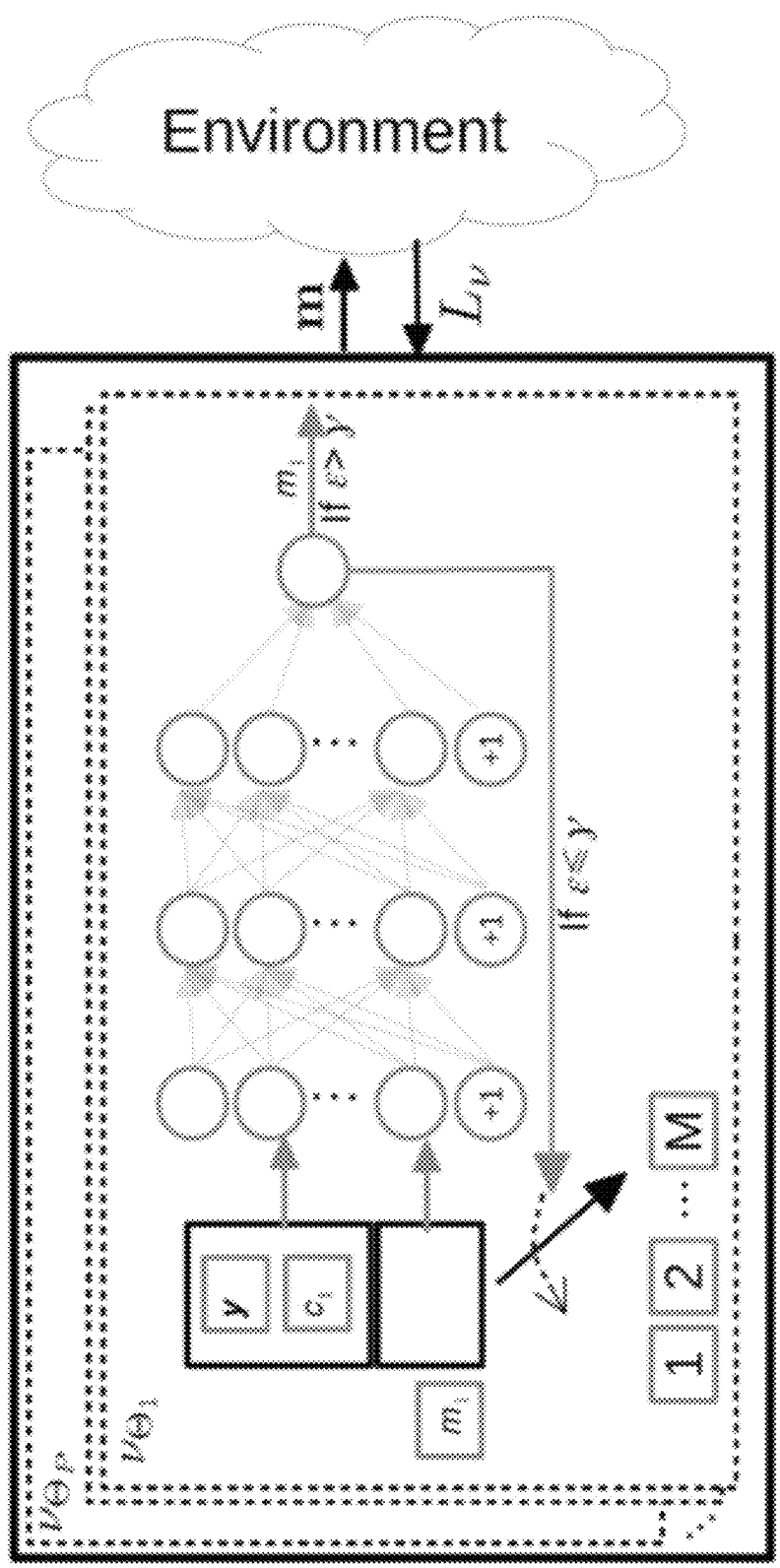
FIG. 17 shows an exemplary radio policy v.

Design. vrAIn's resource manager, illustrated in FIG. 17, is specifically designed to address the following two challenges when solving the above CB problem:

The first challenge is to handle the high number of dimensions of our contextual snapshots. We tackle this by implementing an encoder e that projects each contextual snapshot x into a latent representation y=e(x) retaining as much information as possible into a lower-dimensional space. The design of our encoder is introduced in § 3.2.1.

Figure 15:
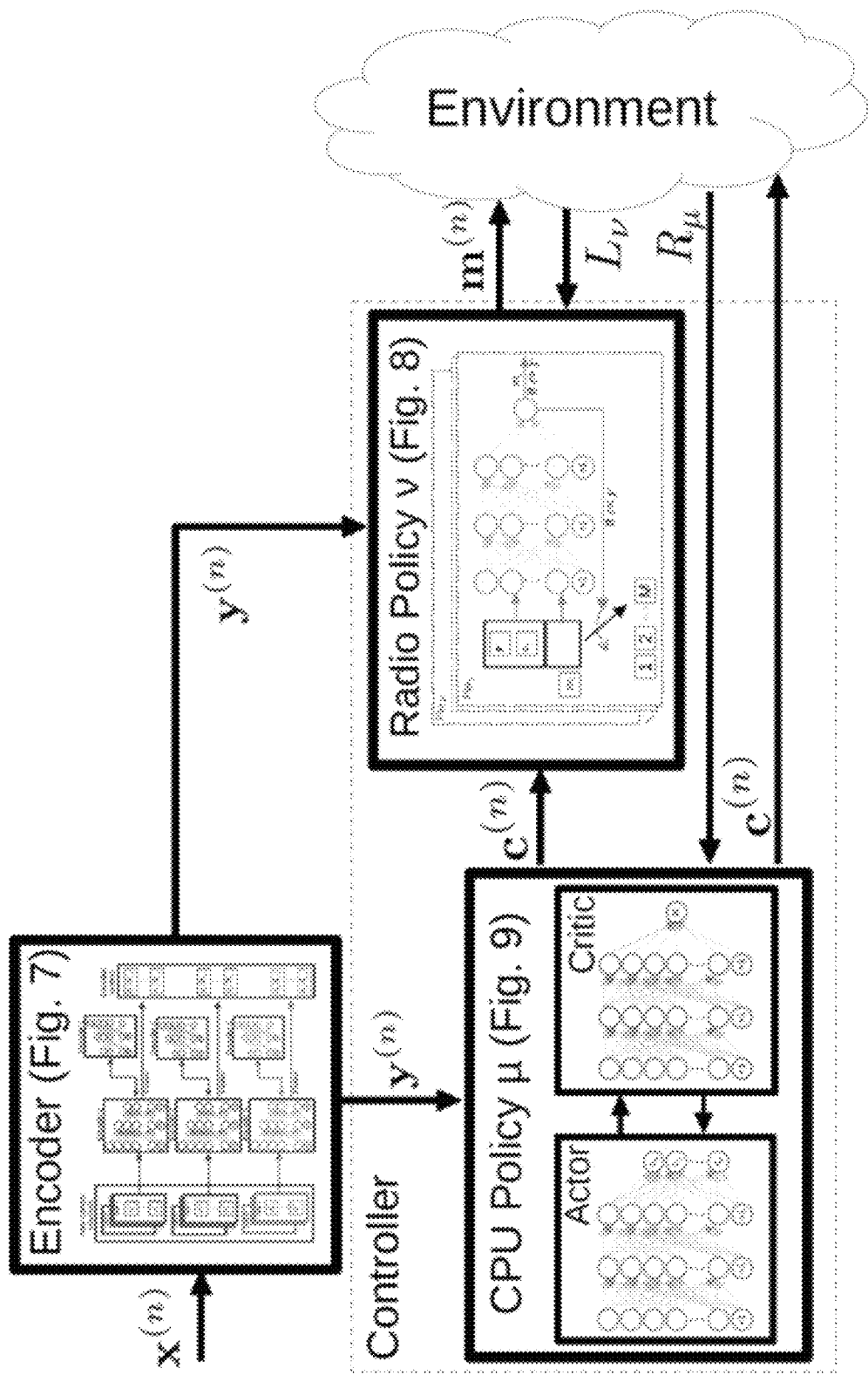
FIG. 15 shows an exemplary system manager.

The second challenge is to manage the large action space and is handled by the controller shown in FIG. 15. Note that an action $a \in \mathcal{A}$ comprises a (real-valued) compute control vector $c \in \mathcal{C}^P$ and a (discrete) radio control vector $m \in \mathcal{M}^P$. Our approach is to decouple the policy $\pi$ that maps contexts into actions from $\mathcal{A}$ into two: a compute control policy $\mu(y)=c$ and a radio control policy $v(y, c)=m$ that are applied sequentially as shown by FIG. 17. We design a simple deterministic policy v by training a deep classifier that maps an (encoded) contextual snapshot e(x) into a radio control vector m that guarantees near-zero decoding error probability given compute allocation c. Policy $\mu$ is more challenging due to the continuous space of possible actions. To address this, we consider a deep deterministic policy gradient (DDPG) algorithm [19], which we implement based on a model-free actor-critic approach that treats deterministic policy v as part of the environment to maximize reward. These methods are introduced in § 3.2.2 (policy v) and § 3.2.3 (policy $\mu$).

3.2.1 Encoder

Evidently, such a high-dimensional contextual space makes our CB problem difficult to handle. To address this, we encode each context $x^{(n)} \in \chi$ X into a lower-dimensional representation $y^{(n)} \in \mathbb{R}^D$ with D≪TP using an embedding or encoding function $e(x^{(n)})$. This is done by the first functional block of the system described in FIGS. 14 and 15.

Note that our contextual data include in highly complex signals (in time and space) as they concern human behavior (communication and/or user mobility patterns) and so, identifying handcrafted features that are useful yet low-dimensional is inherently hard. Moreover, useful representations may highly differ from one scenario to another. For instance, the average function may be good enough encoder of the SNR sequences in low-mobility scenarios, a linear regression model may be useful in high-mobility scenarios, and the variance function may be needed in crowded areas. Similarly, the average data bit-rate may be sufficient when handling a large number of stationary flows whereas variance may be important for real-time flows. Therefore, there is no guarantee that such hand-picked context representations are useful for the problem at hand.

Conversely, we resort to unsupervised representation learning algorithms. In particular, we focus on a particular construct of artificial neural network called Sparse Autoencoder (SAE), which is a tool for such cases. A SAE includes two feedforward neural networks, an encoder (the one we use) $e_\xi$ and a decoder $d_\psi$ characterized by weights $\xi$ and $\psi$, respectively. They are trained together so that a measure of the difference between the reconstructed output of the decoder and the input signal of the encoder x is minimal, $d(y)=d(e(x))\approx x$.

A linear autoencoder, with linear activation functions in the hidden layers, will learn the principal variance directions (eigenvectors) of our contextual data (like classical principal component analysis). However, our goal is to discover more complex, multi-modal structures than the obtained with PCA, and so (i) we use rectified linear units (ReLUs), and (ii) we impose a sparsity constraint in the bottleneck layer (limiting the number of hidden units that can be activated by each input pattern) by adding the Kullback-Leibler (KL) divergence term to the loss function.

In this way, we solve the following optimization problem during training:

$$\underset{\psi,\xi}{\operatorname{argmin}} \sum_{i=1}^{PT} \frac{\|X_i - d(X_i)\|^2}{2PT} + \omega\|\{\psi,\xi\}\| +$$

$$\Omega \sum_{j=1}^{D} KL(\rho\|\rho_j) \text{ where } KL(\rho\|\rho_j) := \rho\log\frac{\rho}{\rho_j} + (1-\rho)\log\frac{1-\rho}{1-\rho_j},$$

with $\rho$ being a sparsity parameter indicating the desired frequency of activation of the hidden nodes (typically small) and $\rho_j$ being the average thresholded activation of hidden node j over all training samples. Moreover $\omega$ and $\Omega$ are hyper-parameters that determine the relative importance given to the weight decay regularization term and the sparseness term in the loss function above. By enforcing the above sparsity constraint, we allow our encoder to learn a code dictionary that minimizes reconstruction error with minimal number of code words.

Note that, as explained in § 3.2, the input signal $x=\{(\bar{\sigma}_{i,n}^{(t)}, \tilde{\sigma}_{i,n}^{(t)})\}_{t=(1,...T)}$ includes of three different sequences. In order to avoid losing the temporal correlations within the sequences, we encode each of the three sequences independently. To this end, we first train three different SAEs, one for each sequence comprising the triple $\langle(\bar{\sigma}_{i,n}^{(t)}, \tilde{\sigma}_{i,n}^{(t)}, \delta_{i,n}^{(t)})\rangle_{t=<1,...,T>}$. Second, we encode sequences corresponding to each individual RAP i in-dependently. Finally, we append all encoded sequences into a single vector $y^{(n)}$. This approach, depicted in FIG. 16, avoids that the SAEs attempt to find correlations across RAPs or across sequences of different nature (SNR vs data load sequences) when optimizing the autoencoder parameters.

In this way, our controller receives an encoded representation of the context $y^{(n)} \in e(\chi)$ as input. In order to accommodate this in our formulation, we let $\hat{\pi}: \mathbb{R}^{(D_1+D_2+D_3)P} \to \mathcal{A}$ be the corresponding function mapping $y^{(n)}=e(x^{(n)})$ into an action in $\mathcal{A}$, with $D_1$, D2 and D3 being the output layer of each of our encoders, and redefine $\hat{\Pi}=\{\hat{\pi}: \chi \to \mathcal{A}, \pi(x)= \hat{\pi}(e(x))\}$.

3.2.2 Radio Policy (v)

In case there are no sufficient computing resources to decode all the frames at the highest MCS allowed by the wireless channel conditions, we may need to impose radio resource constraints to some vRAP. To this end, as explained above, a radio policy can include imposing maximum upper bound MCSs m to the radio schedulers that guarantees that the computing demand does not exceed the available resources. Note that in case there are no computing constraints, the radio policy will provide the highest possible MCS.

Following the above, we design a policy v that receives an encoded context $y_{(n)}$ and a compute allocation $c_{(n)}$ as input, and outputs a suitable radio control decision $m_{(n)}$. Our design includes in a simple neural network $v_{\Theta_i}$, per RAP i characterized by weights $\Theta_i$ with an input layer receiving (y, $c_i$, $m_i$), a single-neuron output layer activated by a sigmoid function and hidden layers activated by a ReLu function. We train each $v_{\Theta_i}$ as a classifier that indicates whether an upper bound MCS equal to $m_i$ satisfies $\varepsilon_i \leq \gamma$, where $\varepsilon_i$ is RAP i's frame decoding error probability (which can be measured locally at the RAP) and $\gamma$ is a (small) threshold—in such a case $m_i$ is an eligible bound for RAP i, given compute allocation $c_i$ and context y—or not ($\varepsilon > \gamma$). We use a standard loss function $L_v((\varepsilon_i)_{i \in \mathcal{P}}$ to train the classifiers. Now, in order to implement our policy $y_\Theta=(v_{\Theta_i})_{i \in \mathcal{P}}$ we loop, for each RAP i, across the set of MCSs in descending order and break the loop in the first $m_i$ flagged by the corresponding classifier as inappropriate ($\varepsilon > \gamma$), as shown in FIG. 17.

In this way, we decouple the control actions m from our action space and rely on a CPU policy (introduced next) to maximize the reward function defined in § 3.2.

3.2.3 CPU Policy ($\mu$)

In the following, we address the design of policy $\mu$ in order to determine the allocation of computing resources that maximizes the reward function R provided in § 3.2. Note that R depends on both compute control decisions, c, and radio control decisions (determined by policy v). However, our MCS selection policy v is deterministic given a compute allocation vector c. As a result, when deriving the optimal policy we can focus on an algorithm that learns the optimal c while treating v as part of the environment. For notation convenience, we redefine our reward function $R_\mu := \mathbb{E}_{(y,r) \sim E}[r(y, \mu(y))]$, with $$r(y, c) = \sum_{i \in \mathcal{P}} J_i(x^{(n)}, c^{(n)}) - \lambda c_i^{(n)} \text{ and } J(y^{(n)}, c^{(n)}) := \frac{1}{T}\Sigma_{t=1}^T Q_i - q_{i,n}^{(t)}.$$

Our goal is hence to learn an optimal compute policy $\mu^* := \arg\max_{\mu \in \mathcal{M}} R_\mu$ subject to $\Sigma_{i=0}^P c_i = 1$ to respect the system capacity (note that $c_0$ denotes unallocated CPU time).

Since the above expectation depends only on the environment and a deterministic MCS selection policy, we can learn $R_\mu$ off-policy, using transitions generated by a different stochastic exploration method. Q learning is an example of a popular off-policy method. Indeed, the combination of Q learning and deep learning (namely DQNs), which use deep neural network function approximators to learn an action-value function (usually represented by the recursive Bellman equation), has shown impressive results in decision-making problems with high-dimensional contextual spaces like is our case. However, DQNs are restricted to discrete and low-dimensional action spaces. Their extension to continuous domains like ours is not trivial, and obvious methods such as quantization of the action space result inefficient and suffer from the curse of dimensionality.

Figure 18:
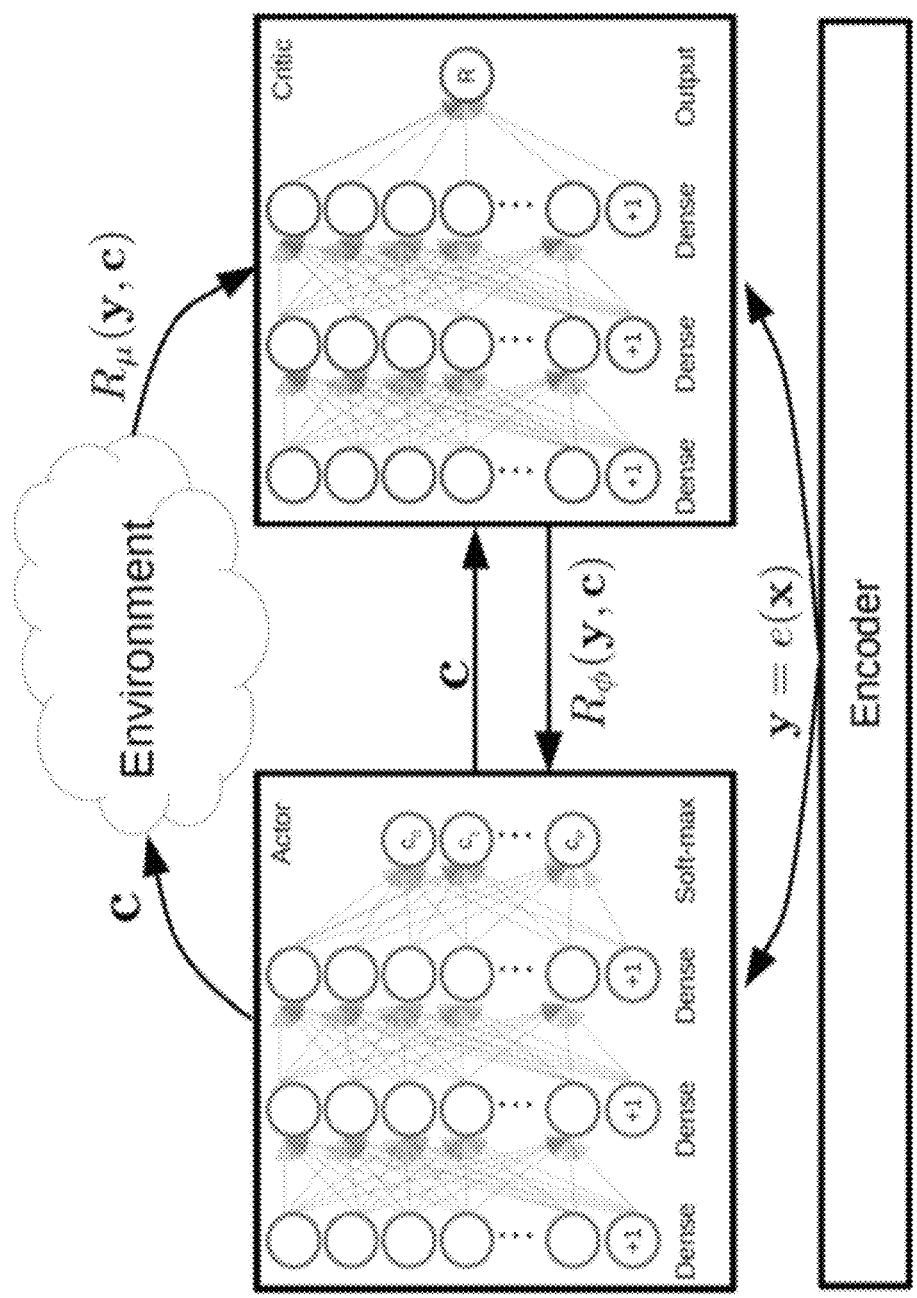
FIG. 18 shows an exemplary CPU policy u.

We can resort to a model-free actor-critic approach based on a deep deterministic policy gradient (DDPG) algorithm, which is a reinforcement learning method successfully adopted in continuous control environments such as robotics or autonomous navigation. The approach is illustrated in FIG. 18. We use a neural network $\mu_\theta$ (the actor) parametrized with weights $\theta$ to approximate our deterministic compute allocation policy, and another neural network $R_\phi(y, c)$ (the critic) parametrized with weights $\phi$ to approximate the action-value function R. As depicted in the figure, the output layer of $\mu_\theta$ (the actor) is a soft-max layer to ensure that $\Sigma_{i=0}^P c_i = 1$. Although they both run in parallel, they are optimized separately. The critic network needs to approximate the action-value function $R_\phi(y, c) \sim R_\mu(y, c)$ and to this end we can use standard approaches such as the following update (called equation 4 in the algorithm below): $\Delta \phi = \beta (R_\mu(y, c) - R_\phi(y, c)) \nabla_\phi R_\phi(y, c)$ with learning rate $\beta > 0$. Regarding the actor, it is sufficient to implement a stochastic gradient ascent algorithm that follows the gradient $\nabla_\theta R_\mu \approx \mathbb{E}[\nabla_\theta \mu_\theta(y) \nabla_c R_\phi(c, c)]$ In this way, the actor updates its weights as follows (called equation 5 in the algorithm below): $\nabla \theta = \alpha \nabla_\theta \mu_\theta(y) \nabla_c R_\phi(y, c)$ with learning rate $\alpha > 0$.

3.3 vrAIn System

Exemplary vrAIn workflow is shown in Algorithm 1. All neural networks are initialized with random weight parameters or, like in our case, with parameters pre-trained with a pre-defined context-action-reward dataset collected in a lab environment (more on this later), as depicted in lines (1)-(9). Both the autoencoders $((e_{\xi_j}, d_{\psi_j})_{j=\{\bar{o}, \hat{o}, \delta\}})$ and radio policy classifiers $((v_{\theta_i})_{i \in \mathcal{P}})$ are trained every N1 and N3 intervals with the last B1 and B3 samples (lines (14) and (25)). Conversely, the actor-critic networks of our CPU policy ($\mu_\theta$, $R_\phi$) are trained every time interval n with the last B2 samples (lines (17) and (18)). In addition, we set a parameter $\epsilon$, which denotes the probability where the policy explores, in such case we simply add random noise to the output of the actor network. As usual, we can lower $\epsilon$ as time passes by to reduce exploration as the learning procedure advances. Ultimately, a compute allocation vector $c^{(n)}$ (lines (22)) and a radio control action $m^{(n)}$ (lines (27)) are computed in order to construct an action $a^{(n)}$ for the current time interval (lines (28)).

Algorithm 1: Exemplary vrAIn algorithm

1: #Autoencoder
2: Initialize autoencoders $(e_{\xi_j}, d_{\psi_j})_{i=\{\bar{o}, \hat{o}, \delta\}}$
3: Set batch size $B_1$ and training period $N_1$ Algorithm 1: Exemplary vrAIn algorithm 4: #CPU policy
5: Initialize actor-critic networks $\mu_\theta$, $R_\phi$
6: Set batch size $B_2$ and exploration rate $\epsilon$
7: #Radio policy
8: Initialize radio policy $v_\Theta = (v_{\theta_i})_{i \in \mathcal{P}}$
9: Set batch size $B_3$ and training period $N_3$
10: for n = $\langle 1, 2, \dots \rangle$ do #Main Loop
11:  Measure reward $\tilde{r}(y^{(n-1)}, c^{(n-1)})$
12:  Observe context $x^{(n)}$
13:  if mod(n, $N_1$) == 0 then
14:   Train SAEs with $\{x^{(n-B1)}, \dots, x^{(n)}\}$
15:  end
16:  $y^{(n)} \leftarrow e(x^{(n)})$
17:  Update critic using eq. (4) with $B_2$ samples
18:  Update actor using eq. (5) with $B_2$ samples
19:  If $\mathcal{U}(0,1) < \epsilon$ then
20:   $\eta \sim \mathcal{N}$ #random noise
21:  end
22:  $c^{(n)} \leftarrow \mu_\theta(y^{(n)}) + \eta$
23:  Measure $(\epsilon_i)_{i \in \mathcal{P}}$
24:  if mod(n, $N_s$) == 0 then
25:   Train using $L_v((\epsilon_i))$ with $B_3$ samples
26:  end
27:  $m^{(n)} \leftarrow v_\Theta(y^{(n)}, c^{(n)})$
28:  $a^n \leftarrow (c^{(n)}, m^{(n)})$ #enforce action
29: end 4. Platform An embodiment of vrAIn follows.

4.1 Radio Access Point

Although there may be different approaches to implement a vRAP stack, it is reasonable to focus on open-source projects as a design guideline for general vRAN solutions. There are nowadays several projects that provide 3G vRAPs (OpenBTS) and 4G LTE vRAPs (OpenAirInterface and the aforementioned srsLTE)-all relying on an SDR platform for radio front-end. We used srsLTE, but we note that the same design principles can be applied to any OFDMA-based vRAP, such as the unlicensed LTE or the upcoming 5G NR.

Figure 19:
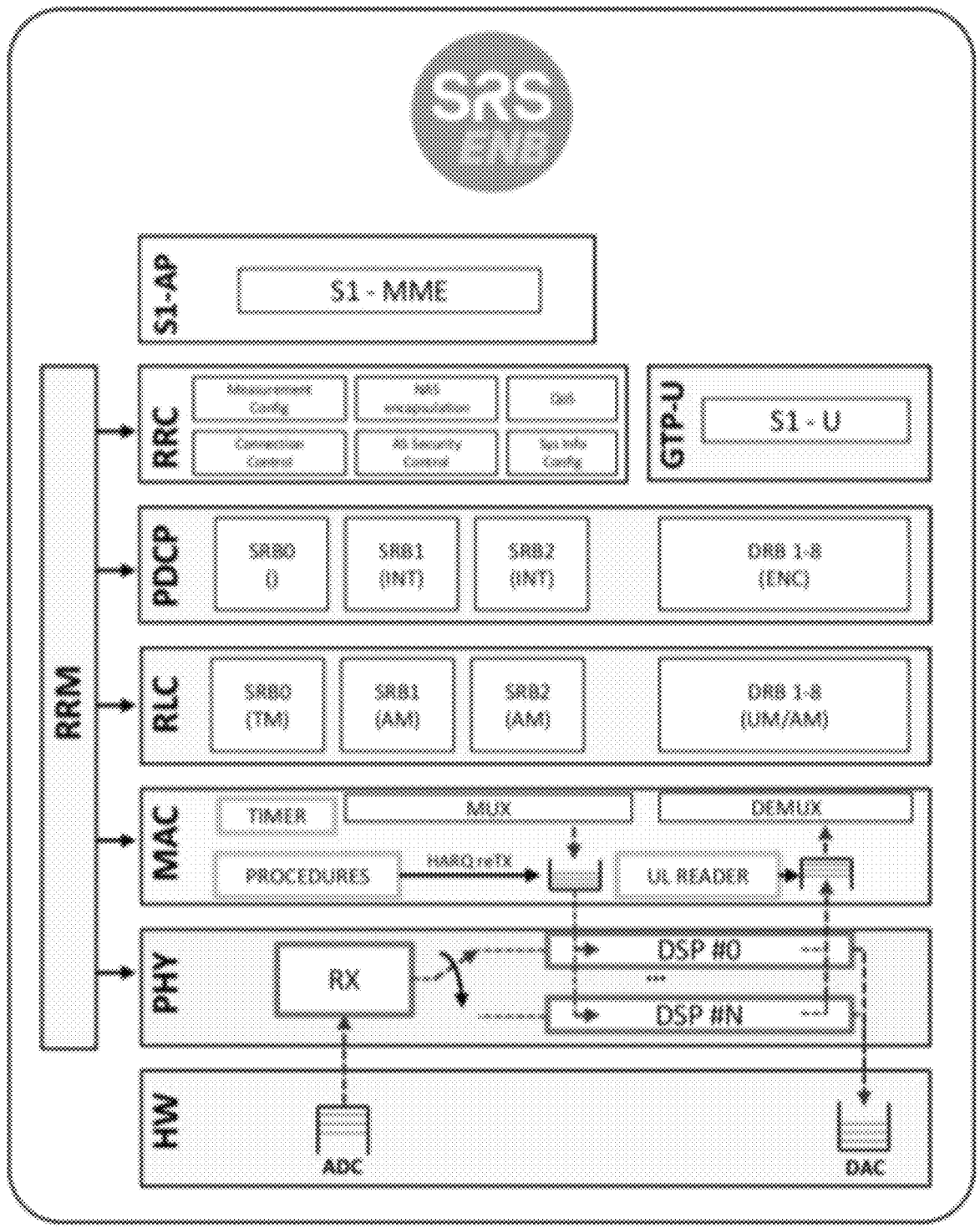
FIG. 19 shows an exemplary threading architecture in an open-source LTE stack.

FIG. 19 illustrates the different modules and compute threads implementing the different layers of an LTE stack. FIG. 19 was obtained from softwareradiosystems.com. Dashed arrows indicate data paths whereas dark arrows indicate interaction between threads or modules. Every 1-ms subframe is assigned to an idle PHY DSP worker, which executes a pipeline that consumes most of the CPU budget of the whole stack, including tasks such as OFDM demodulation, PDCCH search, PUSCH/PUCCH encoding, PDSCH decoding, uplink signal generation and transmission to the digital converter. Having multiple DSPs allows processing multiple subframes in parallel. Since our compute infrastructure includes of 2 and 4-core processors, we set up a total number of 3 DPSs that is sufficient since the HARQ process imposes a latency deadline of 3 ms (3 pipeline stages). The remaining threads perform important operations that are less CPU demanding such as scheduling subframes to DSP workers (PHY RX) or MAC procedures such as random access, uplink/downlink HARQ and scheduling data to physical resource blocks (MAC PROCEDURES), timer services (MAC TIMER), or pushing data from a buffer of uplink transport blocks to the upper layers (MAC UL READER).

In this way, a multi-thread process, which can be virtualized with virtual machines or with Linux containers (LXCs), handles all the stack. vrAIn relies on the latter since it provides both resource isolation (through namespaces) and fine-grained control (through Linux control groups or cgroups) with mini-mal overhead. The compute and radio control interfaces of our platform are detailed in § 4.2 and § 4.3.

4.2 CPU Control

We rely on Docker for computing resource isolation and fine-grained control of individual vRAPs. Docker is an open-source solution that extends LXCs with a rich API that together provides a systematic way to enforce compute resource allocations. Docker relies on control groups (cgroups), a Linux kernel feature that limits, accounts for, and isolates resource usage of Linux processes within the group. Docker uses CFS (Completely Fair Scheduler) for cgroup scheduling. CFS provides weight based scheduling of CPU bandwidth, enabling arbitrary slices of the aggregate resource. We implement a CPU scheduling allocation $c_i \in C := [0,1] \subset \mathbb{R}$ as a CFS CPU quota, which effectively upper bounds the relative CPU time allowed to each vRAP i. In detail, CFS allows the cgroup associated with the vRAP Docker container to cpu. cfs_quota_us units of CPU time within the period of cpu. cfs_period_us (equal to 100 ms by default) by implementing a hybrid global CPU pool approach. In short, the global quota is distributed in slices to local per-CPU caches, where it is then consumed. Then, local accounting for these quota slices is done. This solves scalability issues of local pool accounting, where there is a many-to-many relationship in the computation and storage of remaining quota, and those in a purely global approach where there is large contention on the global storage.

4.3 Radio Control

As mentioned above, we rely on an open-source LTE vRAP implementation, srsLTE, as a proof of concept and focus on PUSCH scheduling, which is the most CPU-demanding channel and the most challenging as we only received periodic feedback from UEs. Specifically, srsLTE allocates scheduling grants to UEs in a round robin fashion and then computes their TB size (TBS) and MCS as follows. First, srsLTE maps the SNR into CQI. Then, it maps the UE's CQI into spectral efficiency using 3GPP specification tables (TS 36.213, Table 7.2.3-1). Finally, it implements a simple loop across MCS indexes to find the MCS-TBS pair that approximates the calculated spectral efficiency. To this aim, srsLTE relies on an additional 3GPP specification table (TS 36.213, Table 7.1.7.1-1) to map an MCS index into a TBS.

A plethora of more elaborated scheduling methods have been proposed (proportional fair, max-weight, exprule, log-rule, etc.). However, as explained in § 3.1, vrAIn can learn the behavior of the low-level scheduler and requires only a handful of lines of code to (i) upper bound the eligible set of MCSs with $m_i$ in the MCS-TBS loop mentioned above, and (ii) expose an interface to the resource manager to modify $m_i$ in an online manner.

Finally, we implement our radio policy v with a set of P feed-forward neural networks (one per RAP) with 11 hidden layers using Keras library in Python. We pre-train it using the above dataset with adam optimizer and accuracy loss function. Then, online training is performed according to Algorithm 1.

4.4 Encoder

In our system implementation, a time interval spans 20 seconds and each contextual sample collects sequences of T=200 samples of mean-variance SNR pairs and data arrivals, $x^{(n)} = \langle (\overline{\sigma}_{i,n}^{(t)}, \tilde{\sigma}_{i,n}^{(t)}, \delta_{i,n}^{(t)}) \rangle_{t=<1,\ldots,200>}$.

Figure 16:
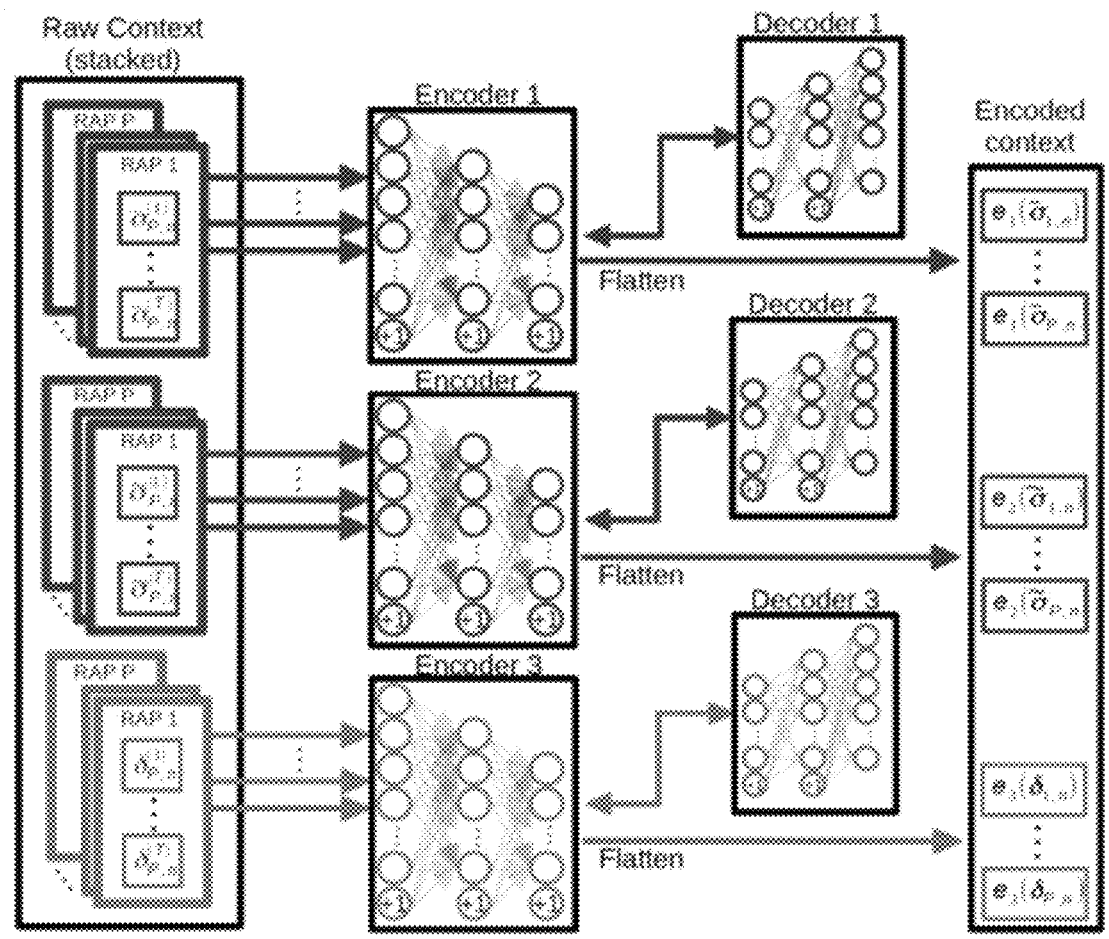
FIG. 16 shows an exemplary encoding function $y=e(x)$.

We implement the deep autoencoder introduced in § 3.2.1 in Python using Keras library. The encoders are imple-mented with 3 hidden layers of size 100, 20 and 4 (mirrored for the decoders), that is, each 200-sample raw contextual sequence is encoded into a 4-dimensional vector and appended together as shown in FIG. 16. We (pre-)train our neural networks using adadelta gradient descend and a set of different sequences experimentally collected in our testbed. After pre-training, the autoencoder is periodically trained "in the wild".

To generate our pre-training set, we set up one vRAP and one UE transmitting traffic in different scenarios:

Scenario 1 (static). The UE is located at a fixed distance from the vRAP and transmits Poisson-generated UDP traffic with fixed mean and fixed power for 60 seconds (i.e. three contextual snapshots). We repeat the experiment for different mean data rates such that the load relative to the maximum capacity of the vRAP is $\{1, 5, 10, 15, \ldots, 100\}\%$ and different transmission power values such that the mean SNR of each experiment is $\{10, 15, 20, \ldots, 40\}$ dB. FIGS. 1, 2 and 3 visualize some results from this scenario.

Scenario 2 (dynamic). We let the UE move following a trajectory departs from the vRAP location (maximum SNR) till it reaches 25 meters away (minimum SNR with connectivity) and then approaches the vRAP with constant speed. We repeat the experiment such that the whole trajectory is completed in $\{10, 20, \ldots, 120\}$ seconds.

Scenario 3 (2 users). We repeat Scenario 1 and 2 with two UEs moving in opposite directions, which produces patterns with different SNR variances.

5.1 Encoder

Figure 20:
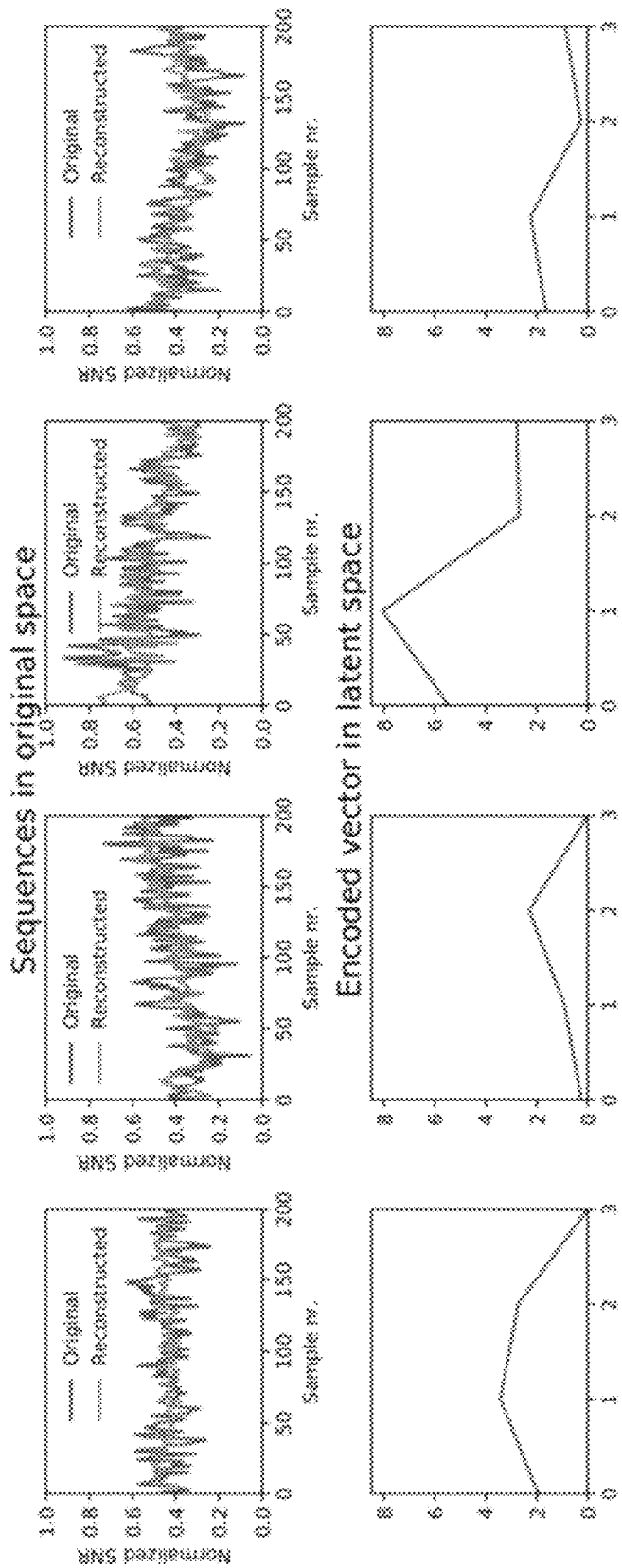
FIG. 20 shows exemplary encoded examples.

FIG. 20 depicts a few examples of mean SNR sequences from our pre-training set (line labeled "Original", top subplots) encoded into 4-dimensional vectors (bottom subplots) and reconstructed using the decoders shown in FIG. 16 (line labeled "Reconstructed", top subplots). These are four representative patterns, which include experiments from each of the scenarios mentioned above, and illustrate how our encoder is capable to preserve expressiveness in a much lower dimensional space. We obtained very similar results for the rest of sequences (omitted for space reasons). We hence conclude that our encoder successfully projects high-dimensional contextual snapshots into manageable representations, input signals of our resource controller.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of assigning resources of a radio access network comprising a processing system and one or more radio access points configured to broadcast over a radio band comprising one or more radio channels, the method comprising:
   acquiring contextual data representative of at least one of: (i) a quality of the radio band and (ii) a quantity of data demanded by user equipment in communication with the one or more radio access points over the radio band;
   generating a compute policy and a radio policy based on the acquired contextual data;
   assigning data transmissions for processing to computing resources of the processing system based on the compute policy;
   scheduling data for transmission over the radio band based on the radio policy; and
   selecting a modulation and coding scheme for the scheduled data transmissions based on the radio policy;
   wherein the data transmissions for processing comprise samples of modulated radio waves received by the one or more radio access points over the radio band from the user equipment and the method comprises:
   measuring data transmission delay, decoding errors, and processing system load; and
   generating the radio policy and the compute policy based on the measured data transmission delay, measured decoding errors, and measured processing system load.

2. The method of claim 1, wherein the contextual data encodes both the quality of the radio band and the quantity of data demanded by the user equipment and acquiring the contextual data comprises:
   measuring a signal-to-noise ratio of the radio band and a rate of incoming data; and
   encoding the measured signal-to-noise ratio and the rate of incoming data into the contextual data, the contextual data comprising a matrix including one or more vectors.

3. The method of claim 1, wherein generating the compute policy and the radio policy comprises:
   feeding the contextual data into a compute neural network hosted on the processing system to create the compute policy and feeding the contextual data into a radio neural network hosted on the processing system to compute the radio policy, each of the policies comprising a respective matrix including one or more vectors.

4. The method of claim 3, comprising:
   measuring a delay associated with buffering outgoing data awaiting modulation;
   measuring a computing load on the processing system;
   computing a reward based on the measured delay and the measured load; and
   training the compute neural network and training the radio neural network based on the computed reward.

5. The method of claim 4, wherein the reward is a scalar, the compute neural network comprises a plurality of compute nodes each including a weighted receptive field and a bias, the radio neural network comprises a plurality of radio nodes each including a weighted receptive field and a bias, and the method comprises:
   training the compute neural network by reweighting and rebiasing the compute nodes based on multiple instances of the contextual data captured across time and multiple instances of the reward captured across time, wherein each of the contextual data instances is paired with a respective one of the reward instances; and
   training the radio neural network by reweighting and rebiasing the radio nodes based on the multiple instances of the contextual data captured across time and the multiple instances of the reward captured across time.

6. The method of claim 1, wherein the contextual data comprises a matrix including a plurality of values and each of the values within the matrix is a scalar encoding both the quality of the radio band and the quantity of data demanded.

7. A processing system configured to assign resources of a radio access network comprising one or more radio access points configured to broadcast over a radio band comprising one or more radio channels, the processing system comprising one or more processors configured to:
   acquire contextual data representative of at least one of: (i) a quality of the radio band and (ii) a quantity of data demanded by user equipment in communication with the radio access point over the radio band;
   generate a compute policy and a radio policy based on the acquired contextual data;
   assign data transmissions for processing to computing resources of the processing system based on the compute policy, wherein the data transmissions for processing comprise samples of modulated radio waves received by the one or more radio access points over the radio band from the user equipment;
   schedule data for transmission over the radio band based on the radio policy; and
   select a modulation and coding scheme for the scheduled data transmissions based on the radio policy.

8. The processing system of claim 7, wherein the one or more processors are configured to:
   measure data transmission delay, decoding errors, and processing system load; and
   generate the radio policy and the compute policy based on the measured data transmission delay, measured decoding errors, and measured processing system load.

9. The processing system of claim 7, wherein the contextual data encodes both the quality of the radio band and the quantity of data demanded by the user equipment and the one or more processors are configured to acquire the contextual data by:
   measuring a signal-to-noise ratio of the radio band and a rate of incoming data; and
   encoding the measured signal-to-noise ratio and the rate of incoming data into the contextual data, the contextual data comprising a matrix including one or more vectors.

10. The processing system of claim 7, wherein the one or more processors are configured to generate the compute policy and the radio policy by:
   feeding the contextual data into a compute neural network hosted on the processing system to create the compute policy and feeding the contextual data into a radio neural network hosted on the processing system to compute the radio policy, each of the policies comprising a respective matrix including one or more vectors.

11. The processing system of claim 10, wherein the one or more processors are configured to:
- measure a delay associated with buffering outgoing data awaiting modulation;
- measure a computing load on the processing system;
- compute a reward based on the measured delay and the measured load; and
- train the compute neural network and training the radio neural network based on the computed reward.

12. The processing system of claim 11, wherein the reward is a scalar, the compute neural network comprises a plurality of compute nodes each including a weighted receptive field and a bias, the radio neural network comprises a plurality of radio nodes each including a weighted receptive field and a bias, and the one or more processors are configured to:
- train the compute neural network by reweighting and rebiasing the compute nodes based on multiple instances of the contextual data captured across time and multiple instances of the reward captured across time, wherein each of the contextual data instances is paired with a respective one of the reward instances; and
- train the radio neural network by reweighting and rebiasing the radio nodes based on the multiple instances of the contextual data captured across time and the multiple instances of the reward captured across time.

13. The processing system of claim 7, wherein the contextual data comprises a matrix including a plurality of values and each of the values within the matrix is a scalar encoding both the quality of the radio band and the quantity of data demanded.

14. A non-transitory computer readable medium comprising code for configuring one or more processors to perform the method of claim 1.

15. A method of assigning resources of a radio access network comprising a processing system and one or more radio access points configured to broadcast over a radio band comprising one or more radio channels, the method comprising:
- acquiring contextual data representative of at least one of: (i) a quality of the radio band and (ii) a quantity of data demanded by user equipment in communication with the one or more radio access points over the radio band;
- generating a compute policy and a radio policy based on the acquired contextual data;
- assigning data transmissions for processing to computing resources of the processing system based on the compute policy, wherein the data transmissions for processing comprise samples of modulated radio waves received by the one or more radio access points over the radio band from the user equipment;
- scheduling data for transmission over the radio band based on the radio policy; and
- selecting a modulation and coding scheme for the scheduled data transmissions based on the radio policy.

16. The method of claim 15, wherein the samples of modulated radio waves received by the one or more radio access points comprise encoded data transmitted by the user equipment.

17. The method of claim 15, wherein the processing of the data transmissions comprises decoding the data transmissions with the computing resources.

18. The method of claim 1, wherein the samples of modulated radio waves received by the one or more radio access points comprise encoded data transmitted by the user equipment; acquiring the contextual data comprises measuring the data transmission delay, the decoding errors, and the processing system load; and the processing of the data transmissions comprises decoding the data transmissions with the computing resources.

* * * * *